(12) United States Patent
Lee et al.

(10) Patent No.: US 10,659,886 B2
(45) Date of Patent: May 19, 2020

(54) ELECTRONIC DEVICE AND SOUND OUTPUT METHOD THEREOF

(71) Applicant: SAMSUNG ELECTRONICS CO., LTD., Suwon-si, Gyeonggi-do (KR)

(72) Inventors: Myungcheol Lee, Suwon-si (KR);
Sunghoon Kim, Osan-si (KR);
Changjin Song, Seoul (KR);
Donghyun Yeom, Bucheon-si (KR);
Jiwoo Lee, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 202 days.

(21) Appl. No.: 15/449,287

(22) Filed: Mar. 3, 2017

(65) Prior Publication Data
US 2017/0277359 A1 Sep. 28, 2017

(30) Foreign Application Priority Data
Mar. 25, 2016 (KR) .......................... 10-2016-0036297

(51) Int. Cl.
*G06F 3/041* (2006.01)
*G06F 1/16* (2006.01)
*H04R 17/00* (2006.01)

(52) U.S. Cl.
CPC ............. *H04R 17/00* (2013.01); *G06F 1/165* (2013.01); *G06F 1/1626* (2013.01); *G06F 1/1637* (2013.01); *G06F 1/1688* (2013.01); *G06F 3/041* (2013.01); *G06F 3/0412* (2013.01); *G06F 2203/04105* (2013.01); *H04R 2400/03* (2013.01); *H04R 2499/11* (2013.01); *H04R 2499/15* (2013.01)

(58) Field of Classification Search
CPC .................................... H04R 17/00; H04R 2499/11; H04R 2499/15; H04R 2400/03; G06F 1/1637; G06F 1/165; G06F 1/1688; G06F 1/1626; G06F 3/041; G06F 3/0412
See application file for complete search history.

(56) References Cited

U.S. PATENT DOCUMENTS 8,310,458 B2 * 11/2012 Faubert .................. G06F 3/016
178/18.01
9,122,011 B2 * 9/2015 Oh .......................... F21V 7/00
(Continued)

FOREIGN PATENT DOCUMENTS

KR 10-2010-0128617 12/2010
KR 10-2013-0025979 3/2013
(Continued)

*Primary Examiner* — Chad M Dicke
(74) *Attorney, Agent, or Firm* — Nixon & Vanderhye P.C.

(57) ABSTRACT

An electronic device and sound output method thereof are provided. The electronic device may include: an input unit comprising input circuitry configured to sense an input from outside of the electronic device; a plurality of piezo drivers including a first piezo driver and a second piezo driver; and a processor functionally connected with the input unit. The processor may be configured to detect an input through the input unit, to use a first piezo driver set including the first piezo driver to output sounds when the detected input corresponds to a first input, and to use a second piezo driver set including the second piezo driver to output sounds when the detected input corresponds to a second input.

16 Claims, 36 Drawing Sheets

(56) References Cited

U.S. PATENT DOCUMENTS

| | | | |
|---|---|---|---|
| 9,134,768 B2* | 9/2015 | Yoon | G06F 1/1626 |
| 10,185,397 B2* | 1/2019 | Yoneoka | G06F 3/016 |
| 2002/0149561 A1* | 10/2002 | Fukumoto | G01C 21/3664 |
| | | | 345/156 |
| 2002/0186860 A1* | 12/2002 | Ogura | H04R 17/00 |
| | | | 381/398 |
| 2003/0067449 A1* | 4/2003 | Yoshikawa | G06F 3/016 |
| | | | 345/173 |
| 2003/0184574 A1* | 10/2003 | Phillips | G06F 3/016 |
| | | | 715/702 |
| 2005/0054390 A1* | 3/2005 | Tuovinen | B06B 1/0215 |
| | | | 455/575.1 |
| 2007/0046642 A1* | 3/2007 | Lee | G06F 3/045 |
| | | | 345/173 |
| 2007/0119698 A1 | 5/2007 | Day | |
| 2008/0216578 A1* | 9/2008 | Takashima | B06B 1/045 |
| | | | 73/658 |
| 2009/0167704 A1* | 7/2009 | Terlizzi | G06F 3/016 |
| | | | 345/173 |
| 2010/0128002 A1* | 5/2010 | Stacy | G06F 3/016 |
| | | | 345/174 |
| 2010/0141408 A1* | 6/2010 | Doy | G06F 3/016 |
| | | | 340/407.2 |
| 2010/0201652 A1* | 8/2010 | Caliskan | G06F 3/016 |
| | | | 345/177 |
| 2010/0225600 A1* | 9/2010 | Dai | G06F 3/016 |
| | | | 345/173 |
| 2010/0315370 A1* | 12/2010 | Tuovinen | B06B 1/0215 |
| | | | 345/173 |
| 2011/0234502 A1* | 9/2011 | Yun | G06F 3/016 |
| | | | 345/173 |
| 2012/0154299 A1* | 6/2012 | Hsu | G06F 3/016 |
| | | | 345/173 |
| 2012/0162143 A1* | 6/2012 | Kai | G06F 1/1626 |
| | | | 345/177 |
| 2012/0242583 A1* | 9/2012 | Molgaard | G06F 3/0235 |
| | | | 345/169 |
| 2013/0108061 A1* | 5/2013 | Ando | G06F 3/0433 |
| | | | 381/55 |
| 2013/0285506 A1* | 10/2013 | Takeda | H02N 2/001 |
| | | | 310/317 |
| 2013/0287233 A1* | 10/2013 | Kong | H04R 17/00 |
| | | | 381/190 |
| 2013/0328820 A1* | 12/2013 | Kondoh | G06F 1/1656 |
| | | | 345/173 |
| 2013/0335210 A1* | 12/2013 | Arai | G06F 3/016 |
| | | | 340/407.2 |
| 2014/0080546 A1 | 3/2014 | Gorilovsky | |
| 2014/0098978 A1* | 4/2014 | Fukuoka | H04R 1/26 |
| | | | 381/190 |
| 2014/0139328 A1* | 5/2014 | Zellers | G06F 3/016 |
| | | | 340/407.2 |
| 2014/0153213 A1* | 6/2014 | Oh | F21V 7/00 |
| | | | 362/19 |
| 2014/0160040 A1* | 6/2014 | Kang | H04R 17/005 |
| | | | 345/173 |
| 2014/0210781 A1* | 7/2014 | Stern | G06F 1/3262 |
| | | | 345/174 |
| 2014/0292691 A1* | 10/2014 | Sugiyama | G06F 3/016 |
| | | | 345/173 |
| 2015/0022459 A1* | 1/2015 | Yliaho | G06F 3/0414 |
| | | | 345/173 |
| 2015/0043748 A1* | 2/2015 | Sudo | H04R 17/00 |
| | | | 381/102 |
| 2015/0084902 A1* | 3/2015 | Atsumi | H04R 17/00 |
| | | | 345/173 |
| 2015/0091876 A1* | 4/2015 | Lee | G06F 3/016 |
| | | | 345/178 |
| 2015/0097786 A1* | 4/2015 | Behles | G06F 3/041 |
| | | | 345/173 |
| 2015/0116205 A1* | 4/2015 | Westerman | G06F 3/016 |
| | | | 345/156 |
| 2015/0123949 A1* | 5/2015 | Li | G06F 3/043 |
| | | | 345/177 |
| 2015/0130770 A1* | 5/2015 | Takatori | G06F 3/043 |
| | | | 345/177 |
| 2015/0177907 A1* | 6/2015 | Takano | G06F 3/016 |
| | | | 345/173 |
| 2015/0178038 A1* | 6/2015 | Yliaho | H04R 3/005 |
| | | | 455/566 |
| 2015/0185955 A1* | 7/2015 | Ando | G06F 3/041 |
| | | | 345/174 |
| 2015/0227280 A1* | 8/2015 | Westerman | G06F 3/016 |
| | | | 715/769 |
| 2015/0234493 A1* | 8/2015 | Parivar | G06F 3/016 |
| | | | 345/174 |
| 2016/0004376 A1* | 1/2016 | Mitsunaga | G06F 1/1684 |
| | | | 345/173 |
| 2016/0034057 A1* | 2/2016 | Ikeda | H04M 1/03 |
| | | | 345/173 |
| 2016/0170539 A1* | 6/2016 | Watanabe | H04M 19/047 |
| | | | 345/173 |
| 2016/0202764 A1* | 7/2016 | Kamata | G06F 3/04883 |
| | | | 715/702 |
| 2016/0246375 A1* | 8/2016 | Rihn | G06F 3/016 |
| 2016/0316301 A1* | 10/2016 | Chen | H04R 17/00 |
| 2016/0334843 A1* | 11/2016 | Uto | G02F 1/133385 |
| 2016/0364098 A1* | 12/2016 | Masaki | G06F 3/048 |
| 2017/0097659 A1* | 4/2017 | Hidaka | G06F 1/1626 |
| 2017/0123638 A1* | 5/2017 | Yamada | G06F 3/041 |
| 2017/0153706 A1* | 6/2017 | Usui | B06B 1/06 |
| 2017/0285848 A1* | 10/2017 | Rosenberg | G06F 3/0416 |
| 2017/0353596 A1* | 12/2017 | Park | G06F 3/0414 |
| 2018/0031683 A1* | 2/2018 | Ping | G01S 15/88 |

FOREIGN PATENT DOCUMENTS

| | | |
|---|---|---|
| KR | 10-2014-0053482 | 5/2014 |
| KR | 10-2015-0000293 | 1/2015 |

* cited by examiner

ELECTRONIC DEVICE AND SOUND OUTPUT METHOD THEREOF

CROSS-REFERENCE TO RELATED APPLICATION

This application is based on and claims priority under 35 U.S.C. § 119 to a Korean patent application filed on Mar. 25, 2016 in the Korean intellectual property office and assigned serial number 10-2016-0036297, the disclosure of which is incorporated by reference herein in its entirety.

TECHNICAL FIELD

The present disclosure relates generally to an electronic device. For example, the present disclosure relates to an electronic device having a sound output unit to output sounds.

BACKGROUND

With advances in mobile communication and processor technologies, electronic devices such as portable terminals can support various functions in addition to traditional call functions. For example, electronic devices may support various functions related to messaging (SMS, MMS or electronic mail), electronic organizers, photography, broadcast reception, video playback, music playback, Internet access, instant messaging, and social networking services.

To provide such various functions, an electronic device may be equipped with a display having a touch panel and sound output means. The sound output means may include a receiver used during a voice call and a speaker to output various sounds at a higher level. A related-art electronic device has a black matrix (BM) region unused for display in the front face, and the BM region is used to mount the receiver.

As the types of content to be output become diverse, the user needs a larger display. However, portability requirements place a limit on the size of the electronic device, and hence the size of the display provided at the front face of the electronic device is limited.

When the size of the display provided at the front face of the electronic device is increased, the space to be used to accommodate the receiver and sensors becomes insufficient.

SUMMARY

Example aspects of the present disclosure address at least the above mentioned problems and/or disadvantages and to provide at least the advantages described below. Accordingly, an example aspect of the present disclosure is to provide an electronic device having a maximally and/or increased enlarged display by removing various sound output means such as the receiver from the front face and arranging the sound output means in a different region.

In accordance with an example aspect of the present disclosure, an electronic device is provided. The electronic device may include: an input unit comprising input circuitry configured to sense an input from the outside of the electronic device; a plurality of drivers including a first piezo driver and a second piezo driver; and a processor functionally connected with the input circuitry. The processor may be configured to detect an input through the input circuitry of the input unit, use a first piezo driver set including the first piezo driver to output sounds when the detected input corresponds to a first input, and to use a second piezo driver set including the second piezo driver to output sounds when the detected input corresponds to a second input.

In accordance with another example aspect of the present disclosure, an electronic device is provided. The electronic device may include: a housing having a first surface facing a first direction and a second surface facing a second direction opposite the first direction, and comprising a transparent substrate including at least a portion of the first surface and a back cover including at least a portion of the second surface; a display disposed between the transparent substrate and the back cover; and a plurality of piezo driver sets arranged between the display and the back cover. The piezo driver sets may be configured to output sounds by vibrating at least a portion of the display or the housing based on an input detected on the transparent substrate.

In accordance with another example aspect of the present disclosure, a method of sound output for an electronic device is provided. The method may include: detecting an input on a touch input of the electronic device; identifying at least a region where the input is detected; and outputting sounds using a piezo driver set corresponding to a region where the input is detected from among multiple piezo driver sets.

In a feature of the present disclosure, it is possible to provide an electronic device having a maximally and/or increased enlarged display in the front face by removing a hole from the front face and arranging the receiver outputting sounds at the back of the display. A sound output method for the electronic device is also provided.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
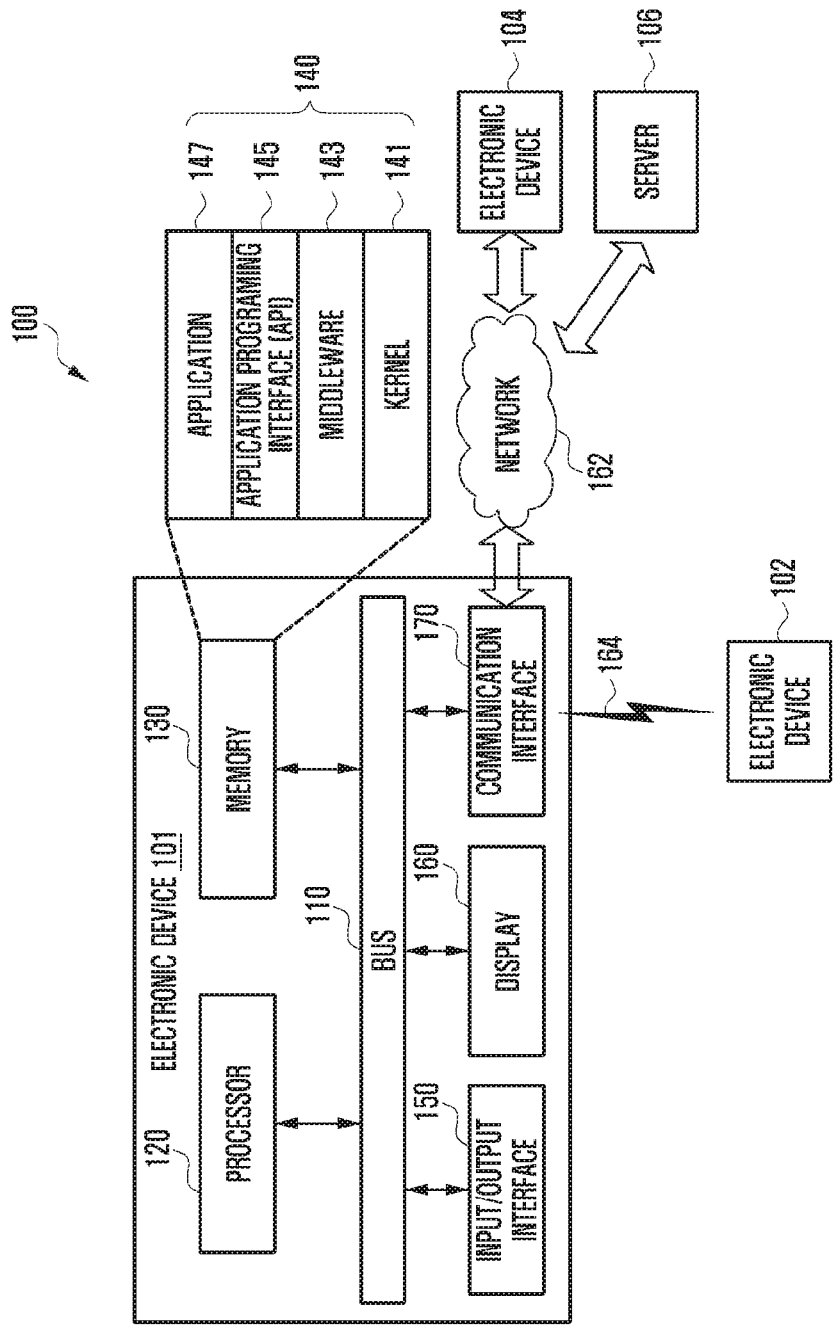
FIG. 1 is a diagram illustrating an example network environment including electronic devices according to various example embodiments.

Hereinafter, various example embodiments of the present disclosure are described in greater detail with reference to the accompanying drawings. While the present disclosure may be embodied in many different forms, specific embodiments of the present disclosure are illustrated in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in the disclosure and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not construed to have an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch), or the like, but is not limited thereto.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating an example electronic apparatus in a network environment according to an example embodiment of the present disclosure.

Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 may include various processing circuitry and can receive commands from the above-mentioned other elements, e.g. the memory 130, the input/output interface 150, the display 160, and the communication interface 170, through, for example, the bus 110, can decipher the received commands, and perform operations and/or data processing according to the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry and can receive, for example, a command and/or data from a user, and transfer the received command and/or data to the processor 120 and/or the memory 130 through the bus 110. The display 160 can display an image, a video, and/or data to a user.

The communication interface 170 may include various communication circuitry and can establish a communication between the electronic apparatus 101 and another electronic devices 102 and 104 and/or a server 106. The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, short-range communication 164 or the like. Each of the electronic devices 102 and 104 may be a same type and/or different types of electronic apparatus.

Figure 2:
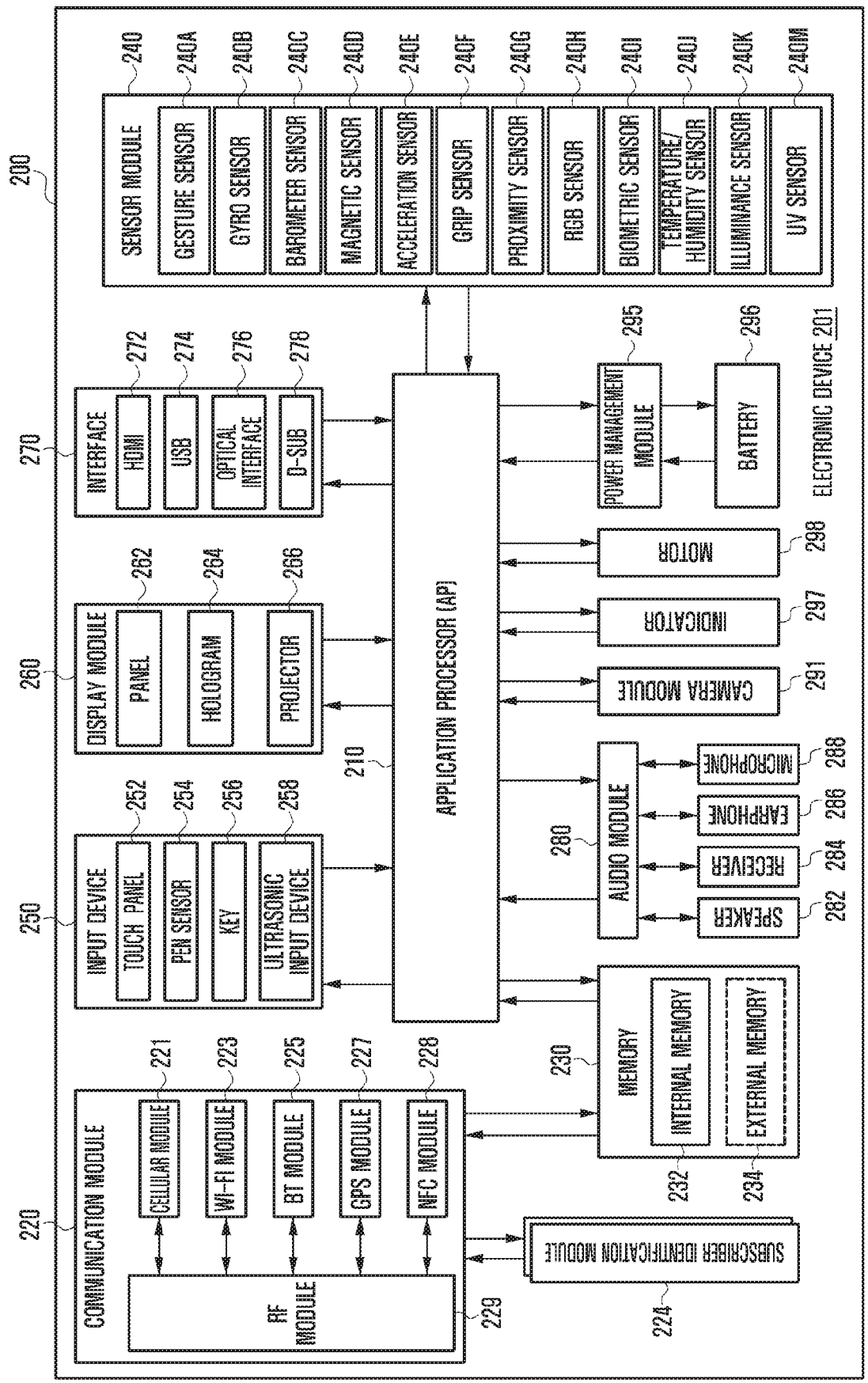
FIG. 2 is a block diagram illustrating an example electronic device according to various example embodiments.

FIG. 2 is a block diagram illustrating an example electronic device 201 in accordance with an example embodiment of the present disclosure. The electronic device 201 may form, for example, the whole or part of the electronic device 101 illustrated in FIG. 1.

Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may include various communication circuitry configured to perform a data communication with any other electronic device (e.g., the electronic device 104 or the server 106) connected to the electronic device 200 (e.g., the electronic device 201) through the network. According to an embodiment, the communication module 220 may include various communication circuitry, such as, for example, and without limitation, a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 230) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electrical signals. The sensor module 240 may include, for example, at least one of a gesture sensor 240A, a gyro sensor 240B, an atmospheric (e.g., barometer) sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination (e.g., illuminance/light) sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. In an example embodiment, the panel 262 may include a pressure sensor (or force sensor) to measure the level of pressure applied by a touch action of the user. The pressure sensor may be implemented as an integrated portion of the panel 262 or implemented as a separate entity using one or more sensors. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 260 illustrated in FIG. 2. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electrical signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 3:
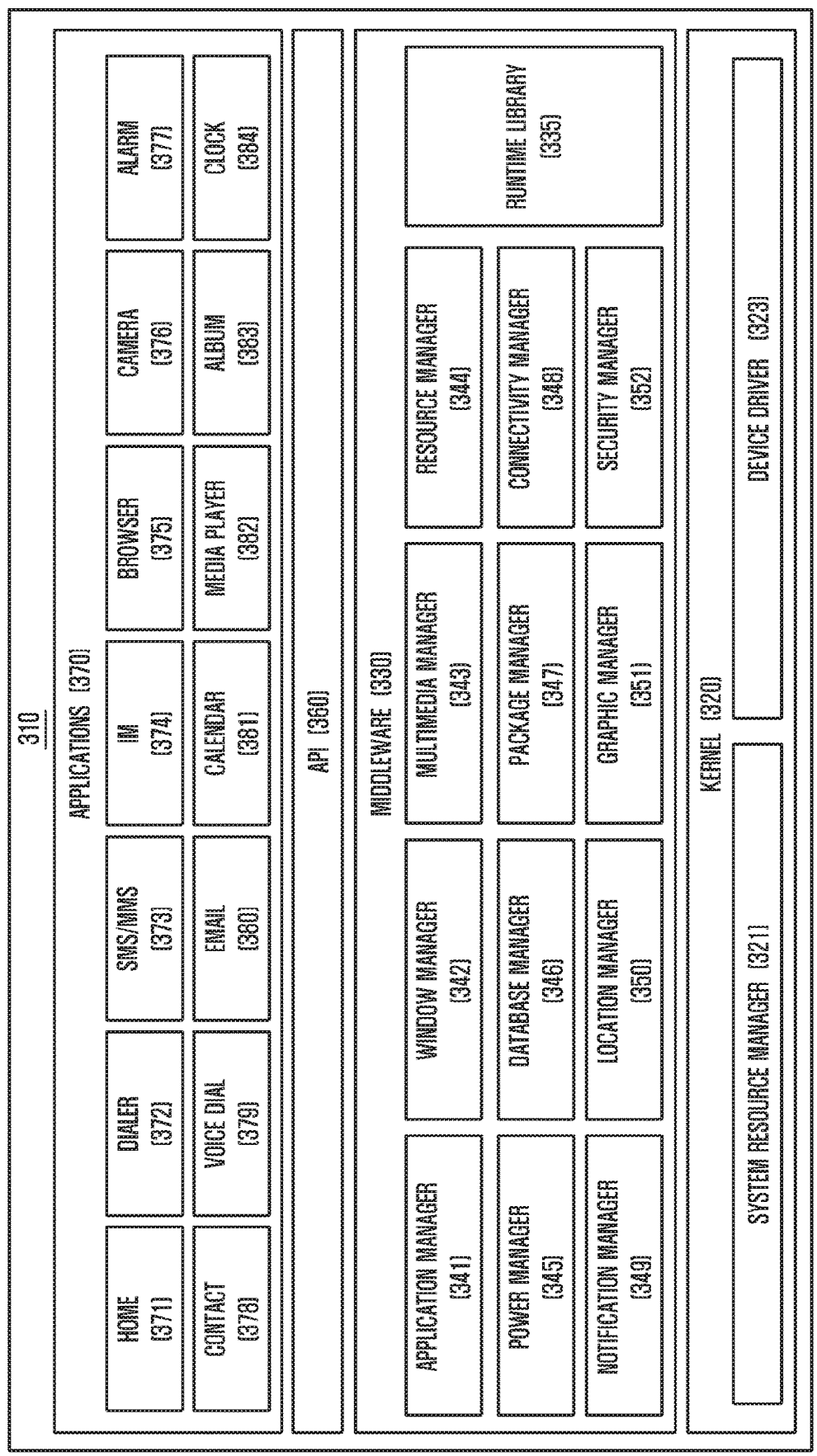
FIG. 3 is a block diagram illustrating an example program module according to various example embodiments.

FIG. 3 is a block diagram illustrating an example configuration of a programming module 310 according to an example embodiment of the present disclosure.

The programming module 310 may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 241) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 243) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 201) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 245) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 247) may include, for example, a preloaded application and/or a third party application. The applications 370 (e.g., the applications 247) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 220. At least a part of the programming module 310 may be implemented (e.g., executed) by, for example, the one or more processors. At least a part of the programming module 310 may include, for example, a module, a program, a routine, a set of instructions, and/or a process for performing one or more functions.

FIGS. 4A, 4B, 4C, 4D and 4E are diagrams illustrating example configurations of an electronic device according to various example embodiments.

Figure 4A:
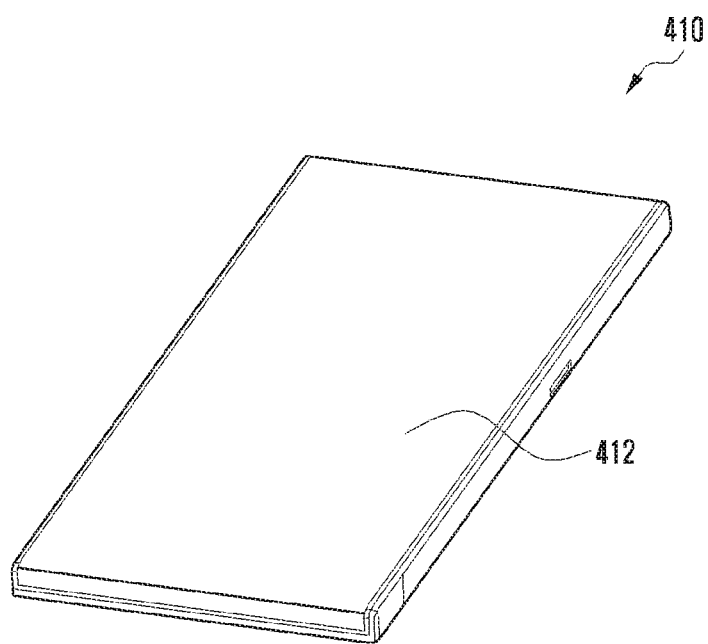
FIGS. 4A, 4B, 4C, 4D and 4E are diagrams illustrating example configurations of an electronic device according to various example embodiments.

As illustrated in FIG. 4A, the display 412 may be arranged so as to substantially occupy the entire front face of the electronic device 410. In an example embodiment, a black matrix (BM) region unused for information display may be completely removed from the front face of the electronic device 410, and the display 412 may be arranged so as to cover not only the whole of the front face but also the left and right edge regions thereof.

In an example embodiment, the front face of the electronic device 410 may include a BM region unused for information display. For example, the electronic device 410 may have a BM region with a length of 1 to 5 mm and a width of 0.1 to 1 mm in the front face.

In an example embodiment, the front face of the electronic device 410 may include a BM region with a width greater than or equal to 1 mm or 5 mm, but the receiver for a voice call may be not present in the BM region.

Figure 4B:
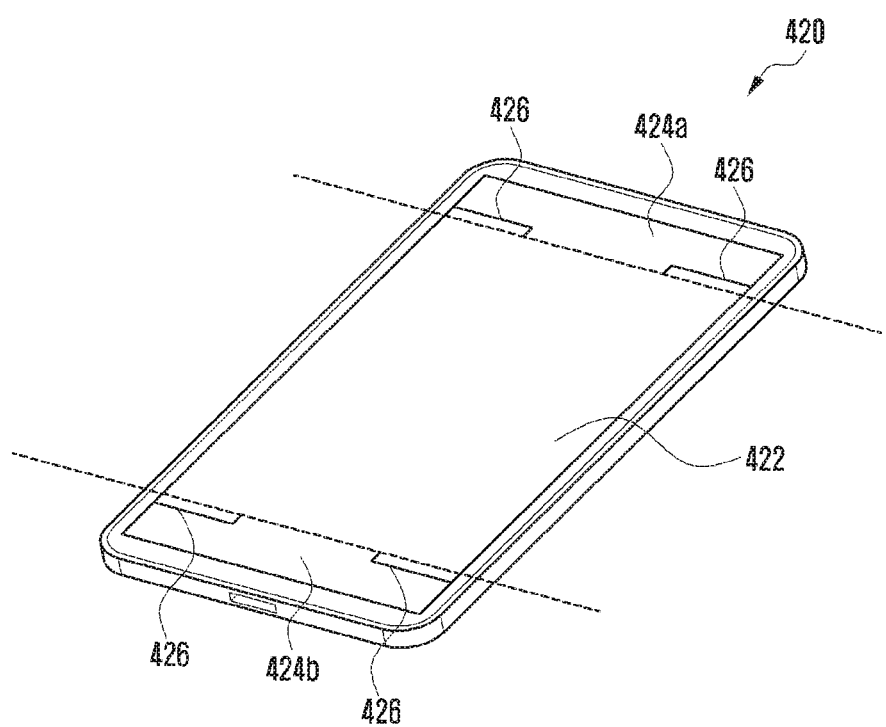

As illustrated in FIG. 4B, the electronic device 420 may include a main display 422 in the central area of the front face, and an alpha display 424a or 424b above and/or below the main display 422. The main display 422 having an aspect ratio of 4:3 or 16:9 may be used to display various images. The alpha display 424a or 424b may be used to display one or more icons indicating the current time, push messages, communication states, and remaining battery power.

Figure 4C:
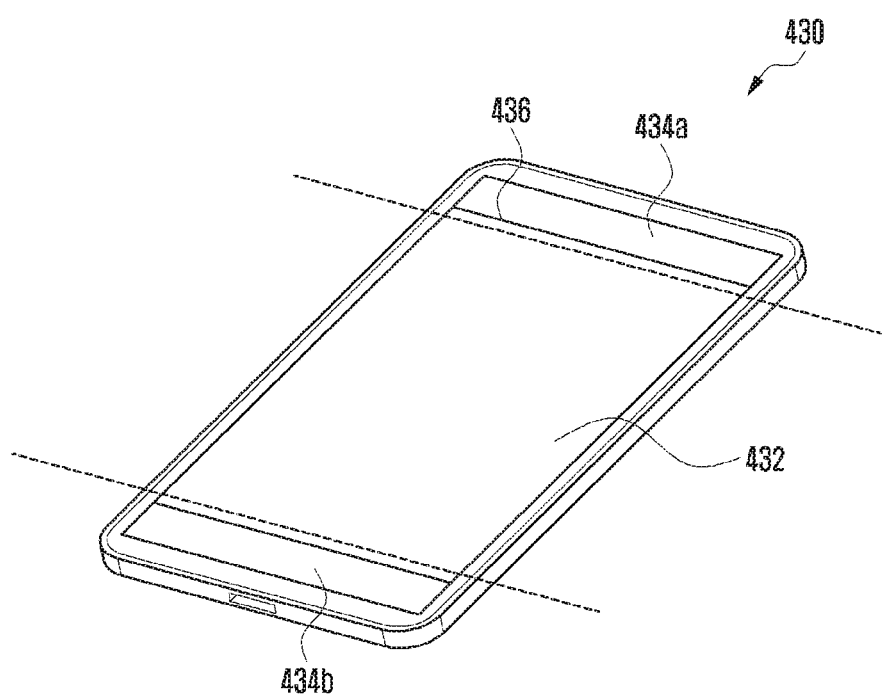

In an example embodiment, the electronic device 420 may include at least one slot 426 in a region of the display area of the front face. For example, as illustrated in FIG. 4B, slots 426 of a given length may be formed at left and right portions of the boundary between the main display 422 and the alpha display 424a or 424b. As another example, as illustrated in FIG. 4C, slots 436 may be formed all along the boundary between the main display 422 and the alpha display 434a or 434b. In FIGS. 4B and 4C, the slots 426 and 436 may be made of a nonconductive material; and, when the alpha displays 424a, 424b, 434a and 434b are made of a conductive material, they may be used as an antenna radiator.

Figure 4D:
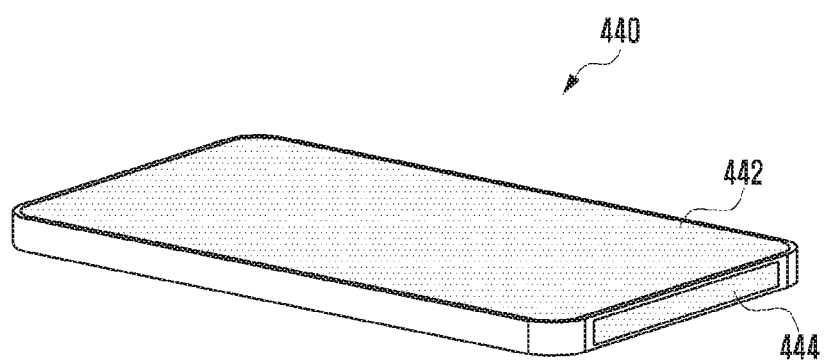

In an example embodiment, as illustrated in FIG. 4D, the electronic device 440 may have a main display 442 in the front face and a sub display 444 in at least one side.

Figure 4E:
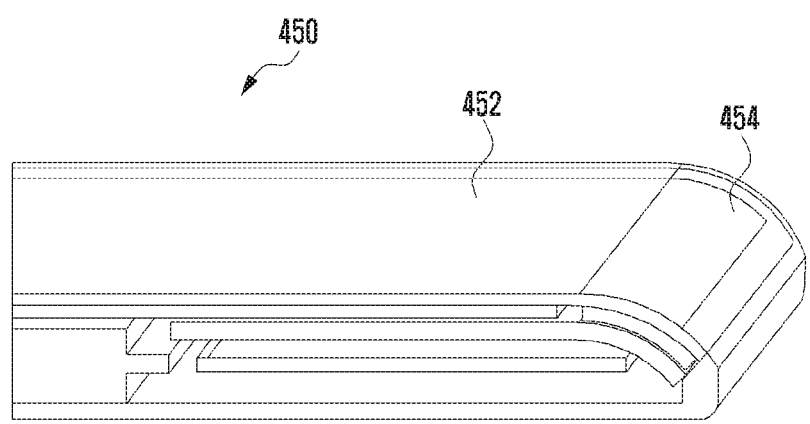

In an example embodiment, as illustrated in FIG. 4E, the electronic device 450 may have a main display 452 in the front face and a sub display 454 of a curved shape in the edge region.

Figure 5A:
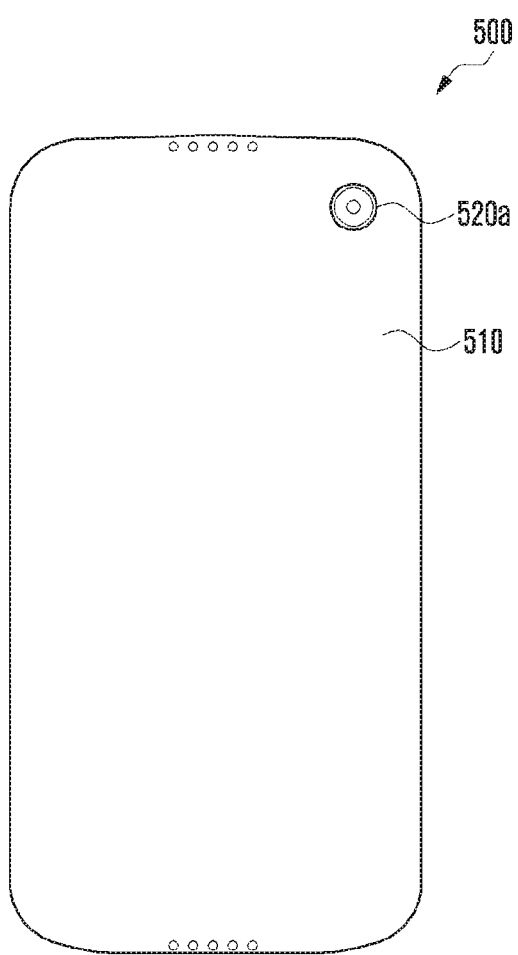
FIGS. 5A and 5B are diagrams illustrating examples of the front face of an electronic device according to various example embodiments.
Figure 5B:
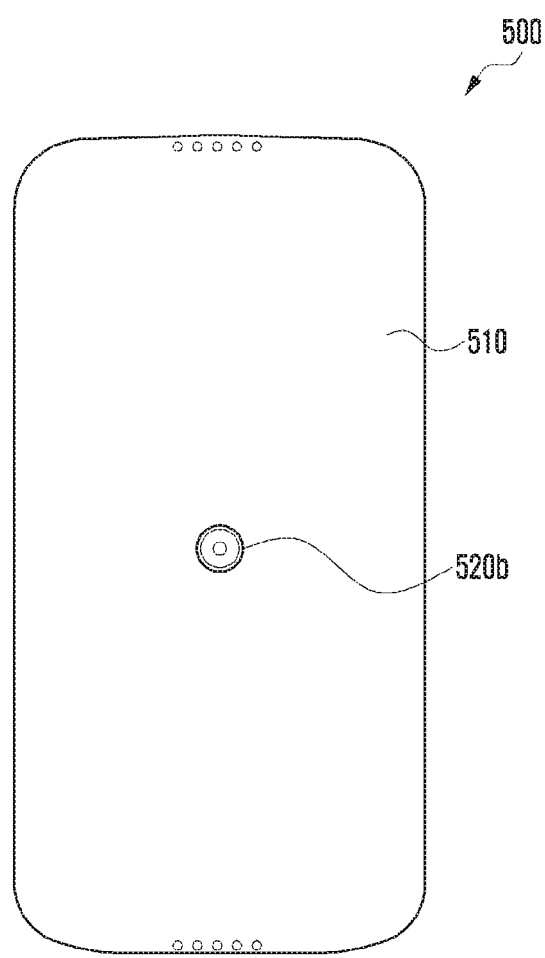

FIGS. 5A and 5B are diagrams illustrating examples of the front face of an electronic device 500 according to various example embodiments.

As illustrated in FIGS. 5A and 5B, the electronic device 500 may have a display 510 occupying the front face and edge region. The front cover of the display 510 has a hole-free structure without an opening like a key or hole viewed from the outside. This hole-free structure may offer an esthetic sense to the user and may enable utilization of a maximally large display within the size of the electronic device.

In an example embodiment, the display 510 may have a certain level of elasticity. When the user presses a portion of a transparent substrate arranged in the upper end region of the display 510, the display 510 may be bent somewhat in a direction toward the rear face of the electronic device 500.

In an example embodiment, at least one sensor 520a or 520b may be arranged on the back of the display 510. The sensor 520a or 520b may receive light from the outside, and may be a camera, proximity sensor, illuminance sensor, fingerprint recognition sensor, or a biometric sensor. The sensor 520a or 520b may correspond to a sensor included in the sensor module 240 of FIG. 2. As the sensor 520a or 520b is placed on the transparent substrate (not shown) made of a transparent material and the back of the display 510, external light passing through the transparent substrate and the display 510 may be sensed by the sensor 520*a* or 520*b*. The sensor 520*a* or 520*b* may contact the back of the display 510 directly or through a different element.

As illustrated in FIG. 5A, the sensor 520*a* may be placed at an upper right end portion with respect to the longitudinal direction of the electronic device 500. As illustrated in FIG. 5B, the sensor 520*b* may be placed at the central portion of the electronic device 500. However, the position of the sensor is not predetermined. The electronic device 500 may have multiple sensors in the front face.

Figure 6:
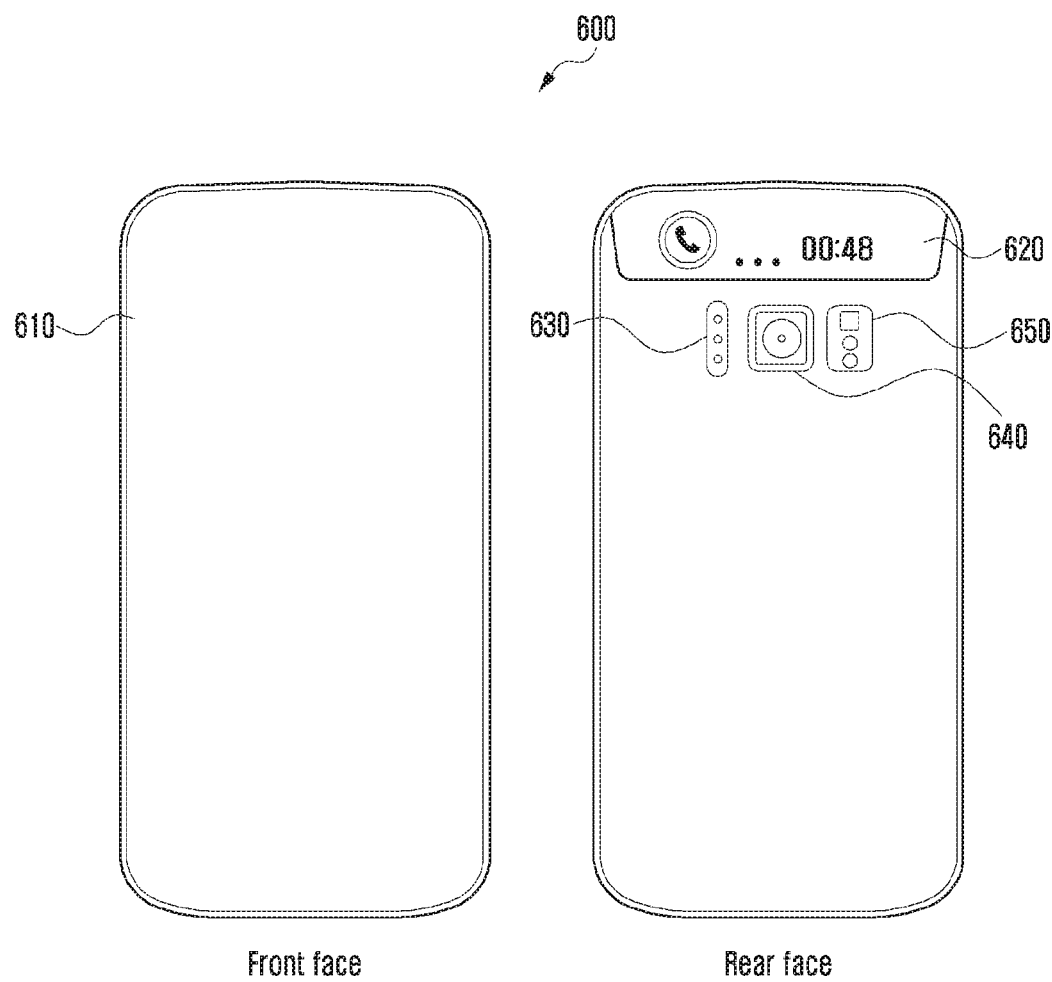
FIG. 6 is a diagram illustrating an example front face and rear face of an electronic device according to various example embodiments.

FIG. 6 is a diagram illustrating an example front face and rear face of an electronic device 600 according to various example embodiments.

As illustrated in FIG. 6, the electronic device 600 may have a main display 610 occupying the entire front face. The main display 610 may be used to display images. A touch panel placed at the back of the main display 610 may be used to detect a touch event on the main display 610.

In an example embodiment, the electronic device 600 may have a sub display 620 in a region of the back of the housing. The sub display 620 may be placed on the upper end region of the electronic device 600 as illustrated in FIG. 6, and may include a touch panel (not shown). The sub display 620 may be used to display various icons for the time and calls, which are not displayed on the main display 610. The sub display 620 may be turned off or deactivated under specific conditions. For example, the sub display 620 may be turned off when a call is in progress or the main display 610 is displaying images.

In an example embodiment, a biometric sensor 650, a camera 640, and a sound output unit 630 may be placed in a region below the sub display 620.

The biometric sensor 650 may obtain information on the body temperature or heartbeat of the user, and may be, for example, a heart rate monitor sensor. When the biometric sensor 650 senses a portion of the body of the user in a contact or contactless manner, it may start to collect biometric information of the user. For example, when the user brings the biometric sensor 650 of the electronic device 600 into contact with the ear, the electronic device 600 may start to measure the heartbeat or temperature of the user by use of the biometric sensor 650.

In an example embodiment, the sound output unit 630 may be placed in the same face as the biometric sensor 650. When the user of the electronic device 600 is engaged in a call, the sound output unit 630 may be used as a receiver outputting the voice of the counterpart. The sound output unit 630 may also be used as a speaker capable of outputting more versatile sounds than the receiver.

In an example embodiment, the camera 640 may be placed in the same face as the biometric sensor 650. The camera 640 may be used to obtain image or video data. The electronic device 600 may control one or more functions on the basis of image data obtained by the camera 640.

The configuration illustrated in FIG. 6 is only an illustration. At least one of the sub display 620, biometric sensor 650, camera 640, and sound output unit 630 may be omitted; at least one thereof may change its position if necessary; and another element may be added.

Figure 7:
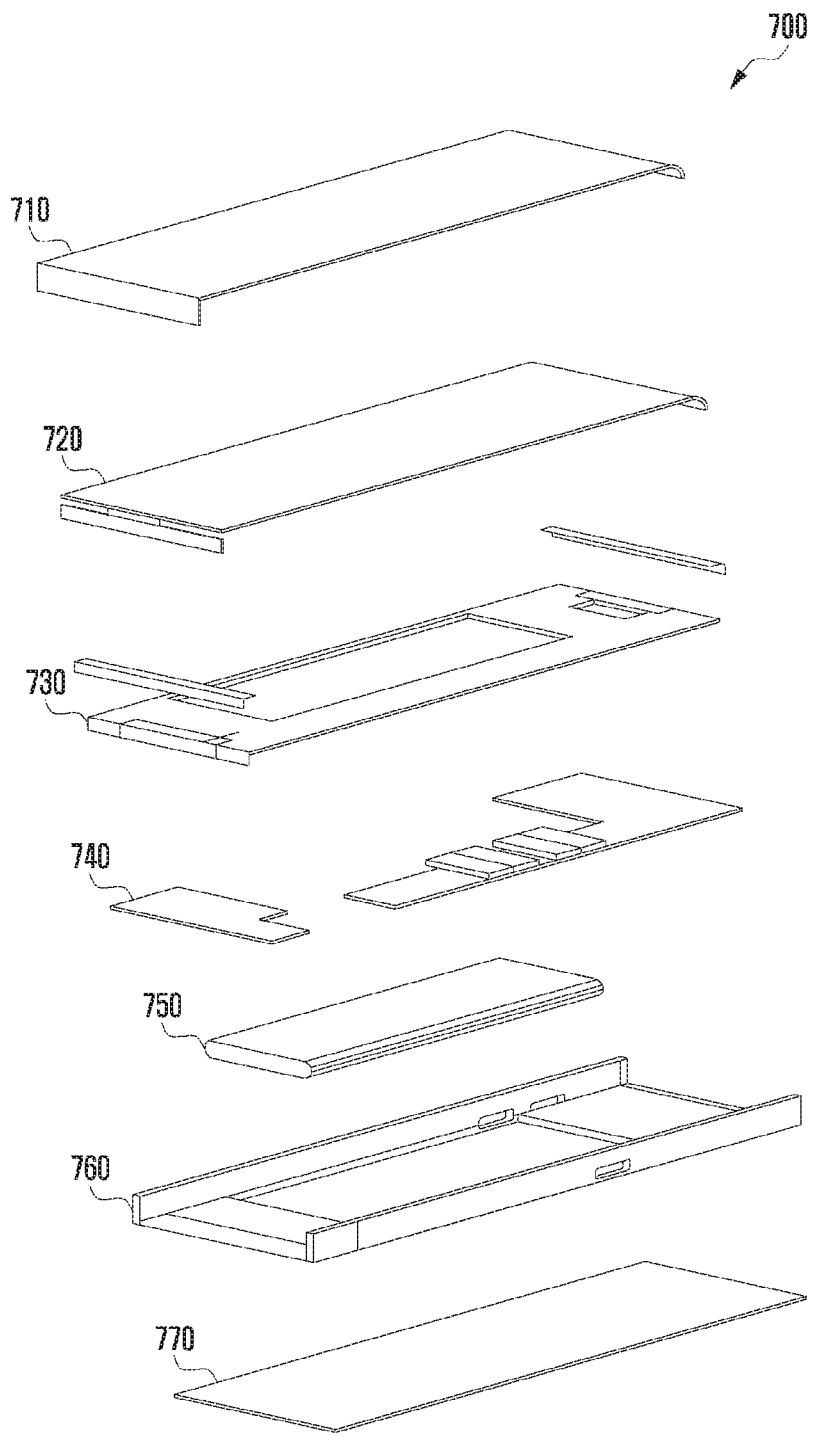
FIG. 7 is an exploded plan view illustrating an example electronic device according to various example embodiments.

FIG. 7 is an exploded plan view illustrating an example electronic device 700 according to various example embodiments.

Referring to FIG. 7, the electronic device 700 may include a transparent substrate 710, a display 720, a bracket 730, a PCB (e.g., printed circuit board) 740, a battery 750, a rear case 760, and a back cover 770, which may be stacked and assembled in the listed sequence.

FIG. 7 illustrates an instance of the electronic device 700, and one or more of the above components may be omitted or replaced without departing from the spirit of the present disclosure. In the following description, the front direction (or first direction) refers to the upward direction of the transparent substrate 710, and the rear direction (or second direction) refers to the downward direction of the back cover 770. For a component, the surface of the component located in the front direction (or first direction) is referred to as the first surface, and the surface of the component located in the rear direction (or second direction) is referred to as the second surface.

The bracket 730, the rear case 760, and the back cover 770 may be assembled together to provide a housing. The transparent substrate 710 may be placed in a region of the first surface of the housing, and the display 720, PCB 740, and battery 750 may be arranged within the housing. Each component constituting the housing may be made of at least one nonconductive material so as not to interrupt flows of electrical signals between internal elements in the housing.

The transparent substrate 710 may be placed in the front direction (or first direction) of the electronic device 700. The transparent substrate 710 may be made of tempered glass so as to transmit at least a portion of light emitted by the display 720.

To display images, as described in connection with FIGS. 4A to 4E, the display 720 may be arranged so as to occupy the entire or substantially the entire front face of the electronic device 700. In the following description, it is assumed that the display 720 is an organic light-emitting diode (OLED) display. However, the display 720 may also be one of related art displays such as liquid crystal display (LCD), light-emitting diode (LED) display, micro electromechanical systems (MEMS) display, and electronic paper display, or the like, but is not limited thereto.

The display 720 may include a touch panel. For example, the touch panel may be placed between the transparent substrate 710 and the display 720. The touch panel may include at least one electrode layer. The electrode layer may be directly formed on the second surface of the transparent substrate 710 or on the first surface of the display 720. Alternatively, the electrode layer may be formed on a separate film (not shown), which may be attached to the transparent substrate 710 or the display 720. For example, one or more electrodes of the touch panel may be arranged within the display 720. Specifically, the electrodes of the touch panel may be placed between the upper substrate and lower substrate of the display 720 among those electrodes driving the display 720. The touch panel may be implemented using a capacitive, resistive, infrared, or surface acoustic wave technology.

The printed circuit board (PCB) 740 may be used to mount various components on an insulation substrate. For example, various components illustrated in FIG. 2 including the processor 210, communication module 220, and memory 230 may be mounted on the PCB 740 and may be electrically interconnected.

The battery 750 may be a rechargeable battery known in the art, and may be installed in the electronic device 700 as an embedded or removable element.

FIGS. 8A, 8B, 8C, 8D, 8E and 8F are sectional views of the display according to various example embodiments.

Figure 8A:
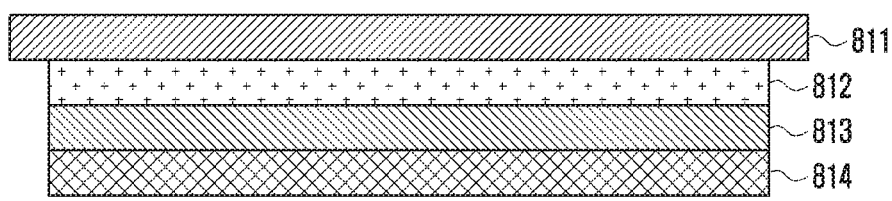
FIGS. 8A, 8B, 8C, 8D, 8E and 8F are sectional views of an example display according to various example embodiments.

In an example embodiment, as illustrated in FIG. 8A, a cover glass 811, a touch panel 812, a display panel 813, and a pressure sensor 814 may be sequentially stacked in the first-to-second direction to form a display. Here, the cover glass 811, touch panel 812, and display panel 813 may be made of a transparent material, and the pressure sensor 814 may be made of an opaque material.

Figure 8B:
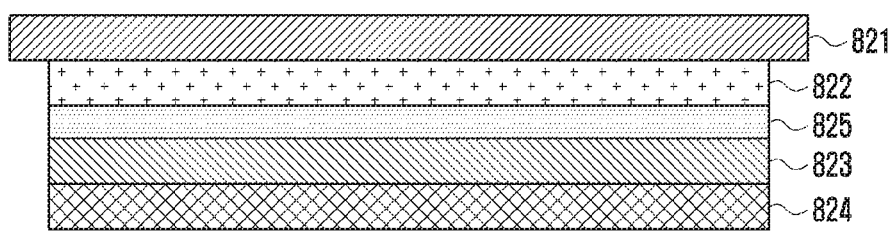

In an example embodiment, the display may be of touch integrated with cover glass type. As illustrated in FIG. 8B, the touch panel 822 may be formed directly under the cover glass 821, and the adhesive layer 825 may be formed between the cover glass 821 (or touch panel 822) and the display panel 823. The pressure sensor 824 may be placed in the second direction of the display panel 823.

Figure 8C:
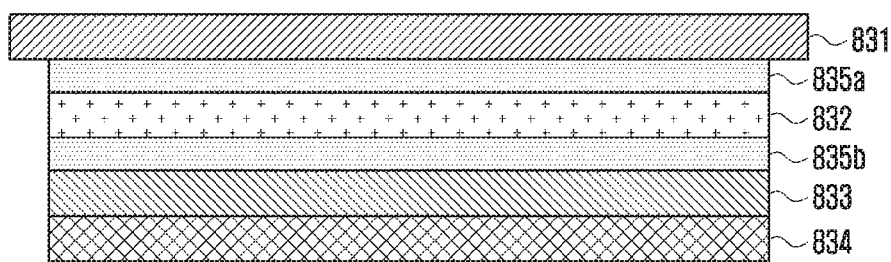

In an example embodiment, the display may be of add-on type. As illustrated in FIG. 8C, film or glass layers 835a and 835b may be formed separately under the cover glass 831, and the touch panel 832 may be placed between the film or glass layers 835a and 835b. The display panel 833 and pressure sensor 834 may be placed sequentially in the second direction of the film or glass layer 835b.

Figure 8D:
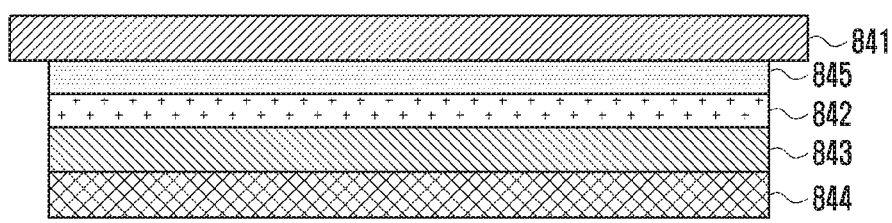

In an example embodiment, the display may be of on-cell type. As illustrated in FIG. 8D, the touch panel 842 may be formed directly on the display panel 843. The adhesive layer 845 may be formed between the display panel 843 (or touch panel 842) and the cover glass 841. In this embodiment, the pressure sensor 844 may be disposed at the bottom of the stack.

Figure 8E:
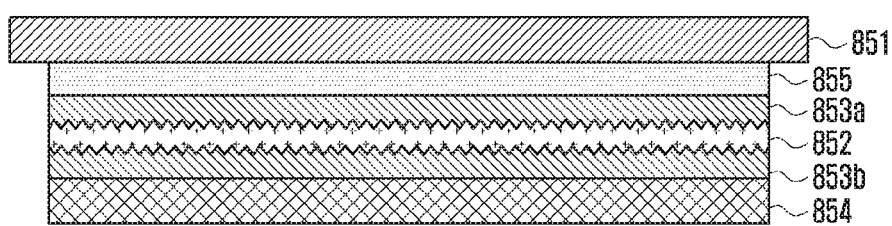

In an example embodiment, the display may be of in-cell type. As illustrated in FIG. 8E, the touch panel 852 may be formed directly within the display panel 853a and 853b. Adhesive layer 855 may be disposed between the panel 853a and the cover glass 851, and the pressure sensor 854 may be disposed at the bottom of the stack.

Figure 8F:
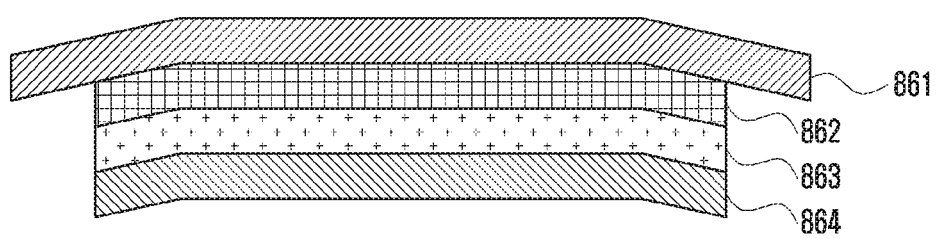

In various example embodiments, the display illustrated in one of FIGS. 8A to 8E may have at least one curved edge on the side. Referring to FIG. 8F, a cover glass 861, a touch panel 862, a display panel 863, and a pressure sensor 864 may be sequentially stacked, as illustrated in FIG. 8A, so as to form curved edges on both sides. The display illustrated in one of FIGS. 8B to 8E may have at least one curved edge on the side as in the case of FIG. 8F, and a detailed description thereof is omitted.

Figure 9:
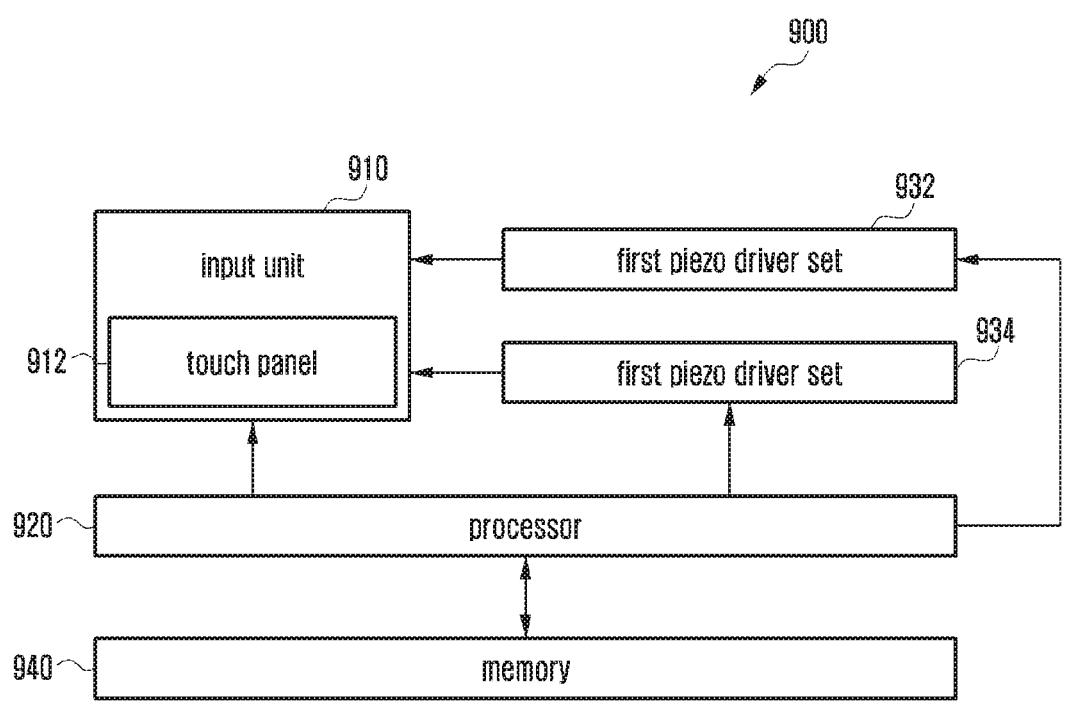
FIG. 9 is a block diagram illustrating an example electronic device according to various example embodiments.

FIG. 9 is a block diagram illustrating an example electronic device 900 according to various example embodiments.

As illustrated in FIG. 9, the electronic device 900 may include an input unit (e.g., including input circuitry) 910, a processor (e.g., including processing circuitry) 920, a memory 940, and multiple piezo driver sets 932 and 934. One or more of the above components may be omitted or replaced if necessary without departing from the spirit of the present disclosure. The electronic device 900 may include one or more components of the electronic device 101 illustrated in FIG. 1 or the electronic device 201 illustrated in FIG. 2, may be of the same shape as that illustrated in one of FIGS. 4A to 4E, FIGS. 5A and 5B, and FIG. 6, and may have a stacked structure as illustrated in FIG. 7.

The electronic device 900 may have a housing (not shown), and various elements may be arranged in the housing. A transparent substrate (not shown) may be formed in a region of the front face of the housing.

The input unit 910 may include various input circuitry and be configured to detect input from the outside of the electronic device 900. The input unit 910 may include input circuitry including, for example, and without limitation, a touch panel 912. A transparent substrate and a display panel (not shown) may be arranged in the rear direction (or second direction) of the touch panel 912. The stacked structure of the touch panel 912 and the display panel is the same as described in connection with FIGS. 8A to 8F.

The processor 920 may include various processing circuitry configured to control the components of the electronic device 900 and perform communication and computation. The processor 920 may include one or more of the elements of the processor 120 of FIG. 1 and/or the application processor 210 of FIG. 2. The processor 920 may be electrically and/or functionally connected with the internal components of the electronic device 900 such as the input unit 910, memory 940, and piezo driver sets 932 and 934.

The memory 940 may include, but not limited to, a volatile memory and nonvolatile memory known in the art. The memory 940 is electrically connected with the processor 920 and may store a variety of instructions executable by the processor 920. The instructions may include arithmetic operations, logic operations, and control operations for data movement and input/output, and the processor 920 may recognize these operations. The processor 920 may start its action by loading instructions stored in the memory 940.

In an example embodiment, the electronic device 900 may include multiple piezo driver sets 932 and 934. For example, the electronic device 900 may include a first piezo driver set 932 and a second piezo driver set 934 as illustrated in FIG. 9. In the following description, the electronic device 900 is described as including two piezo driver sets 932 and 934. However, the number of piezo driver sets present in the electronic device 900 may vary. Each piezo driver set 932 or 934 may include at least one piezo driver, and each piezo driver may include at least one piezo element.

The piezo driver set may be used to output a sound signal. As described before in connection with FIGS. 4A to 4E, the display occupies the entire front face of the electronic device 900 and the front face has a hole-free structure. In this case, the receiver, which outputs a voice signal during a call, cannot be present in the front face of the electronic device 900. As such, the electronic device 900 of the present disclosure may output sounds to the user by use of the piezo driver sets 932 and 934. The piezo element is a well-known element that can convert an electrical signal into vibrations. To output sounds, an electrical signal may be input to the piezo element. Then, the piezo element may vibrate an object in contact therewith (e.g. vibrating medium or a part of the input unit 910). The object in contact with the piezo element may act as a transducer and generate air vibrations, thereby producing sounds. Such a piezo element is described in greater detail below with reference to FIG. 10.

In an example embodiment, the input unit 910 may sense a touch input caused by an external object (e.g. finger or stylus) and determine the input region on the input unit 910. When the sensed input corresponds to a first input, the processor 920 may control the piezo driver sets 932 and 934 to output sounds.

The processor 920 may determine the region of the touch panel 912 in which a touch input is sensed. When the determined region corresponds to a first region, the processor 920 may determine that the sensed input is a first input; and when the determined region corresponds to a second region, the processor 920 may determine that the sensed input is a second input. Here, the piezo driver set 932 or 934 may be configured to vibrate the region where an input is detected. For example, the first piezo driver set 932 may be configured to vibrate the first region of the touch panel 912 upon detection of a first input; and the second piezo driver set 934 may be configured to vibrate the second region of the touch panel 912 upon detection of a second input.

In an example embodiment, the first piezo driver set 932 and the second piezo driver set 934 may be placed in the back of the input unit 910 or in one side of the electronic device 900. The first piezo driver set 932 may be placed at the back of the first region of the input unit 910 so that vibrations generated by the first piezo driver set 932 are directly transferred to the first region of the input unit 910. Alternatively, a vibrating medium may be placed between the first piezo driver set 932 and the first region of the input unit 910 so that vibrations generated by the first piezo driver set 932 are transferred to the first region through the vibrating medium. At least one of the first piezo driver set 932 and the second piezo driver set 934 may be placed in at least one side of the electronic device 900.

Figure 10:
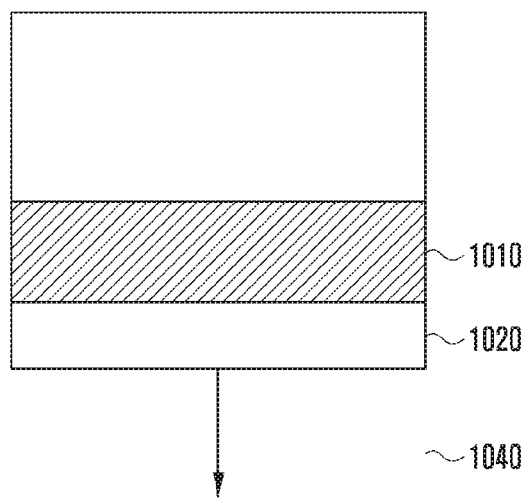
FIG. 10 is a sectional view illustrating an example piezo driver according to various example embodiments.

FIG. 10 is a sectional view illustrating an example piezo driver of an example piezo driver set according to various example embodiments.

The piezo driver includes a piezo element 1010, and the piezo element 1010 may generate vibratory motion in a specific direction (e.g. perpendicular to the contact layer).

One surface of the piezo element 1010 may come in contact with at least a portion of the contact layer 1020. Here, the contact layer 1020 may be the back of the input unit, one side of the electronic device, or the vibrating medium. Vibrations of the piezo element 1010 are transferred to the contact layer 1020 and the contact layer 1020 vibrates the air immediately around it, outputting sounds to the outside.

Figure 11:
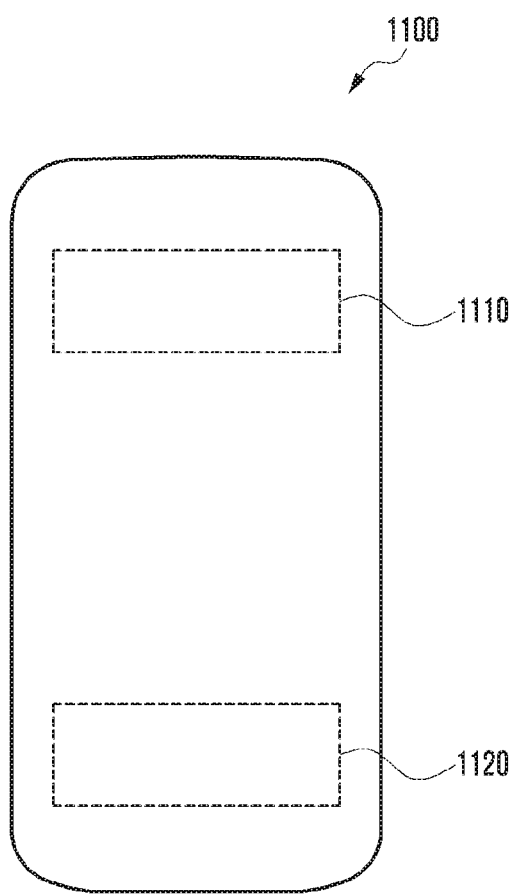
FIG. 11 is a diagram illustrating an example arrangement of piezo driver sets according to various example embodiments.

FIG. 11 is a diagram illustrating an example arrangement of piezo driver sets according to various example embodiments.

As described above, since the electronic device 1100 has a display occupying the entire front face, there may be no need to distinguish between the upper part and the lower part in the electronic device 1100 while in actual use. In the case of an existing electronic device, a receiver outputting sounds is placed at an upper end portion of the display and a microphone picking up the voice signal of the user is placed at a lower end portion of the display. During a voice call, the user has to hold the electronic device so that the receiver is close to the ear and the microphone is close to the mouth. On the other hand, as the electronic device 1100 of the present disclosure has a display occupying the entire front face, the user may make a voice call regardless of the direction of the electronic device 1100.

To achieve this, as illustrated in FIG. 11, the first piezo driver set may be arranged so that sounds can be output through a first region 1110 located above the central region of the electronic device 1100, and the second piezo driver set may be arranged so that sounds can be output through a second region 1120 located below the central region. Vibrations caused by the first piezo driver set may be transferred directly or through a medium to the first region 1110, through which sounds may be output into the air, and vibrations caused by the second piezo driver set may be transferred directly or through a medium to the second region 1120, through which sounds may be output into the air.

In an example embodiment, the electronic device 1100 may be configured to activate the first piezo driver set to output sounds through the first region 1110 of the input unit when an input is detected on the first region 1110 of the input unit, and to activate the second piezo driver set to output sounds through the second region 1120 of the input unit when an input is detected on the second region 1120 of the input unit. This is because the user tends to bring the electronic device 1100 into contact with the ear during a voice call. That is, sounds may be output through one of the first region 1110 and the second region 1120 where a contact with the ear is detected.

Figure 12:
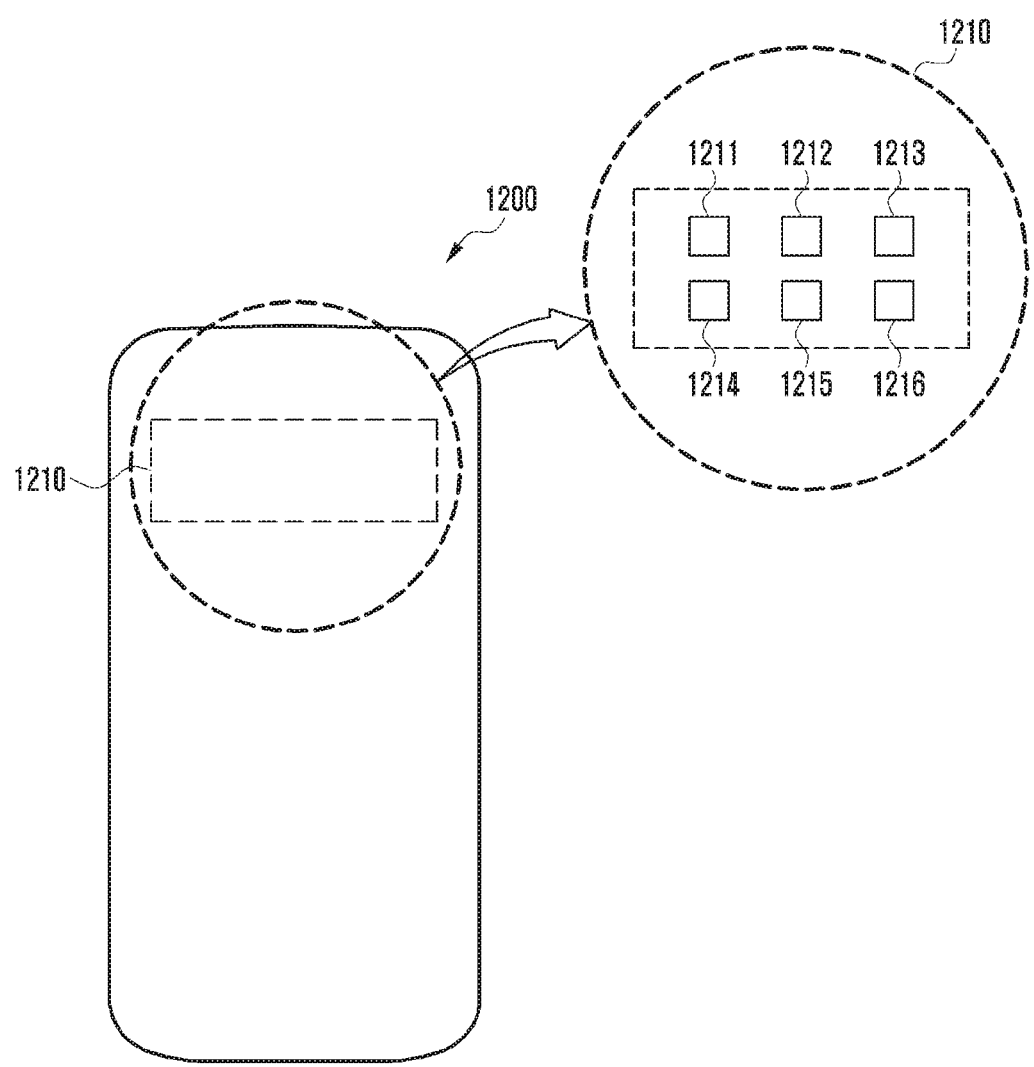
FIG. 12 is a diagram illustrating an enlarged view of an example piezo driver set according to various example embodiments.

FIG. 12 is a diagram illustrating an enlarged view of a piezo driver set according to various example embodiments.

In an example embodiment, a piezo driver set may include a plurality of piezo drivers. For example, as illustrated in FIG. 12, the first piezo driver set 1210 may include six piezo drivers 1211 to 1216.

As the level of sound output by one piezo driver is limited, the electronic device 1200 may adjust the number of activated piezo drivers in the piezo driver set according to the level of sound to be output.

Figure 13:
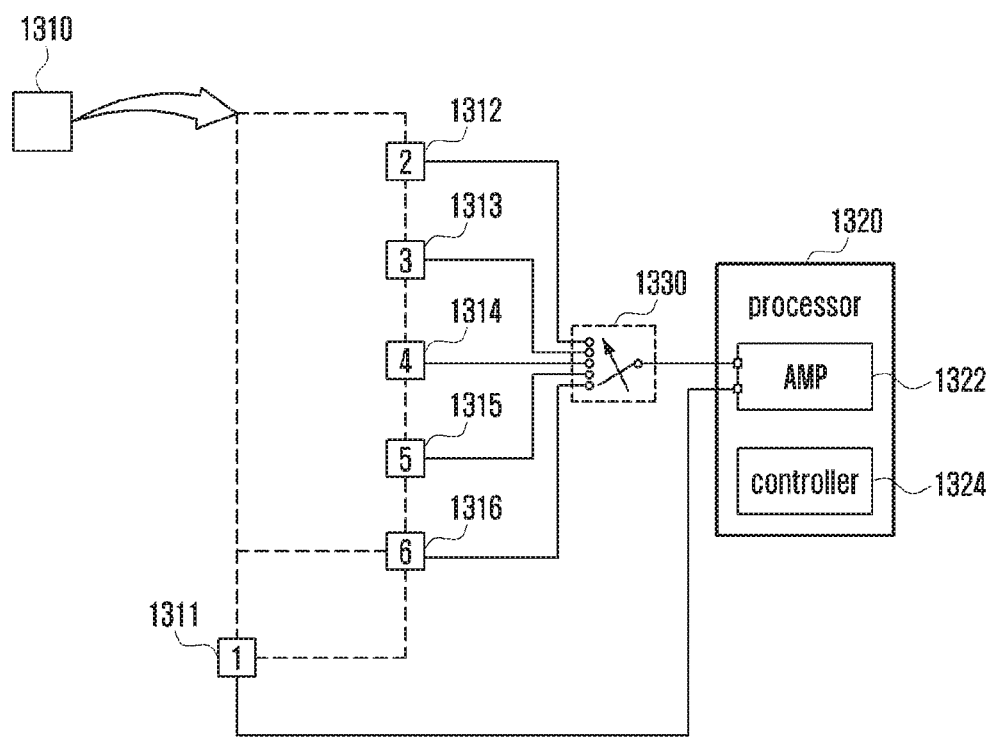
FIG. 13 is a diagram illustrating an example structure of an example piezo driver according to various example embodiments.

FIG. 13 is a diagram illustrating an example structure of the piezo driver according to various example embodiments.

As illustrated in FIG. 13, each piezo driver 1310 may include a plurality of piezo elements 1311 to 1316. Here, the terminal of the first piezo element 1311 is fixedly connected with one end of the amplifier (AMP) 1322 of the processor 1320, the terminals of the second to sixth piezo elements 1312 to 1316 may be connected with the switch 1330.

In an example embodiment, the piezo driver may operate in a manner similar to a variable resistor. For example, as the first piezo element 1311 is connected with the second to sixth piezo elements 1312 to 1316, the contact area may change and the driving area of the piezo driver may change accordingly.

The controller 1324 of the processor 1320 may control the switch 1330 to make an electrical connection with one of the second to sixth piezo elements 1312 to 1316 according to the level of sounds to be output through the piezo driver.

For example, when the sound level is low, the AMP 1332 may be connected with the terminal of the sixth piezo element 1316, permitting only one piezo element to output sounds. When the sound level is the maximum, the AMP 1332 may be connected with the terminal of the second piezo element 1312, permitting five piezo elements to output sounds. That is, the processor 1320 may adjust the sound volume by changing the number of piezo elements being driven.

Figure 14A:
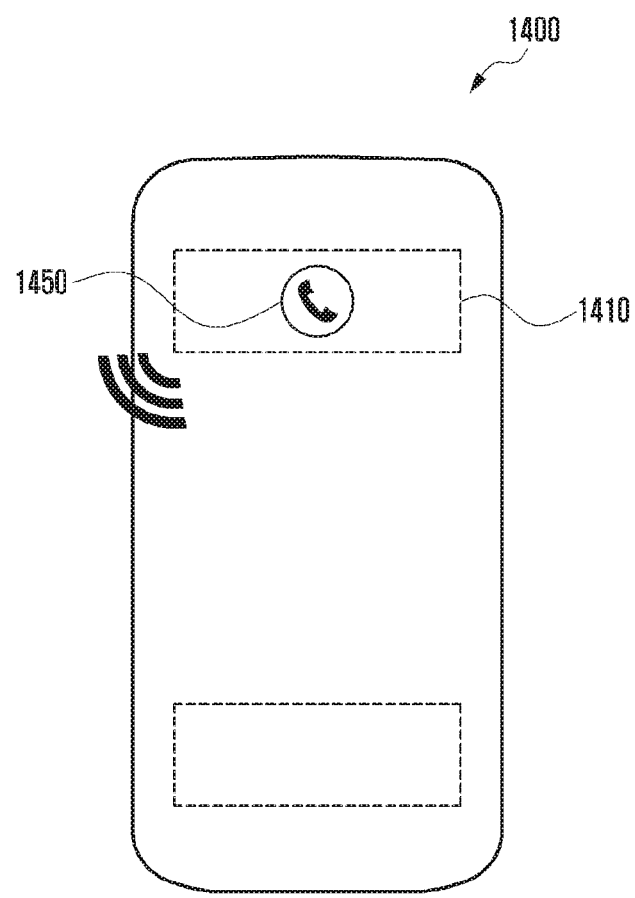
FIGS. 14A, 14B and 14C are diagrams illustrating example user interfaces displayed during call processing according to various example embodiments.
Figure 14B:
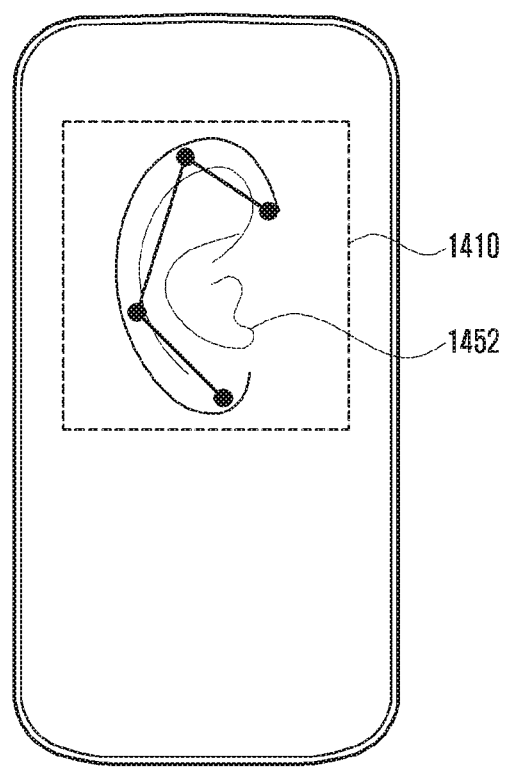
Figure 14C:
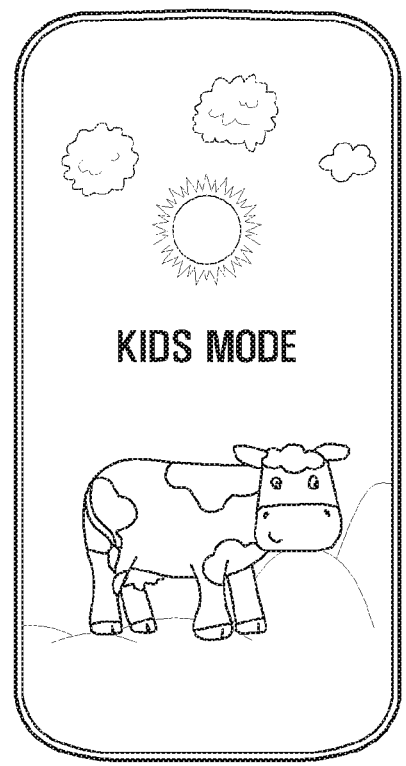

FIGS. 14A, 14B and 14C are diagrams illustrating example user interfaces displayed during call processing according to various example embodiments.

As described above, since the display occupies the entire front face of the electronic device 1400, there may be no need to distinguish between the upper part and the lower part in the electronic device 1400 while in actual use, and the electronic device 1400 may output sounds using one of the first piezo driver set and the second piezo driver set according to the region where an input is detected.

In an example embodiment, when sound is output through one of the first piezo driver set and the second piezo driver set, the processor may display a GUI window indicating the region where sound is output. As illustrated in FIG. 14A, when the user is engaged in a voice call while the first region 1410 is brought into contact with the ear, the first piezo driver set vibrates the first region 1410 to output sounds and the processor may output an icon 1450 representing a voice call on the first region 1410.

In an example embodiment, the processor (e.g. processor 920 of FIG. 9) may identify the region where the user contacts on the display and authenticate the user according to the contact region. For example, the electronic device 1400 may generate contact region information by determining the region where the ear contacts and store the contact region information as authentication information. Thereafter, the electronic device 1400 may perform user authentication by comparing the identified contact region with the stored authentication information. When a voice call is in progress, the electronic device 1400 may display, but not limited to, a call icon (e.g. icon 1450 illustrated in FIG. 14A) or an ear-like icon representing a contact with the ear of the user (e.g. icon 1452 illustrated in FIG. 14B).

In an example embodiment, the processor may change the operating mode of the electronic device 1400 according to the identified contact region. For example, when the user is determined as a child according to the identified contact region, as illustrated in FIG. 14C, the processor may change the operating mode of the electronic device 1400 to kid's mode. In kid's mode, the electronic device 1400 may display a restricted GUI, allowing only preset applications to be accessed.

Figure 15A:
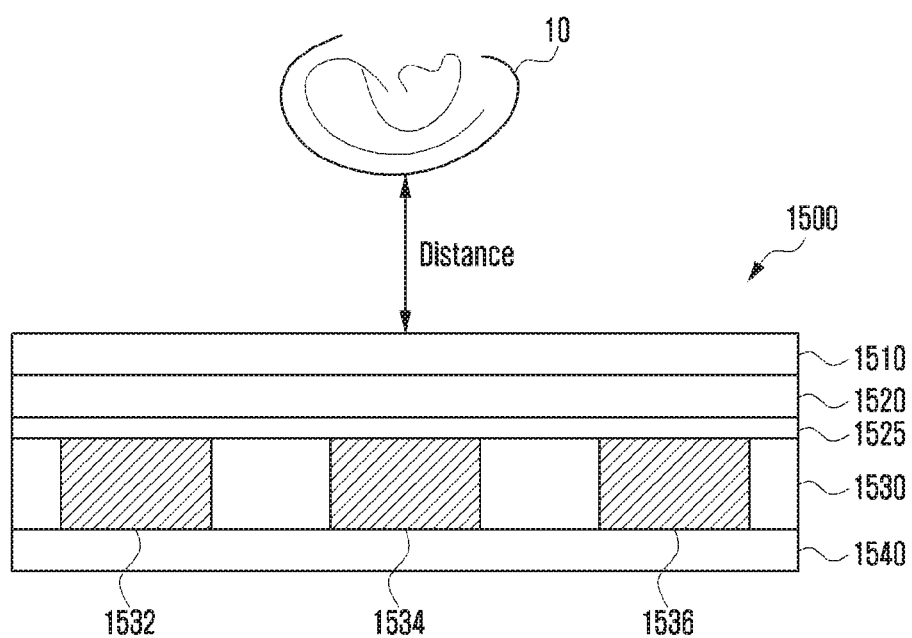
FIGS. 15A and 15B are diagrams illustrating example sound output based on the distance between an object and the electronic device according to various example embodiments.
Figure 15B:
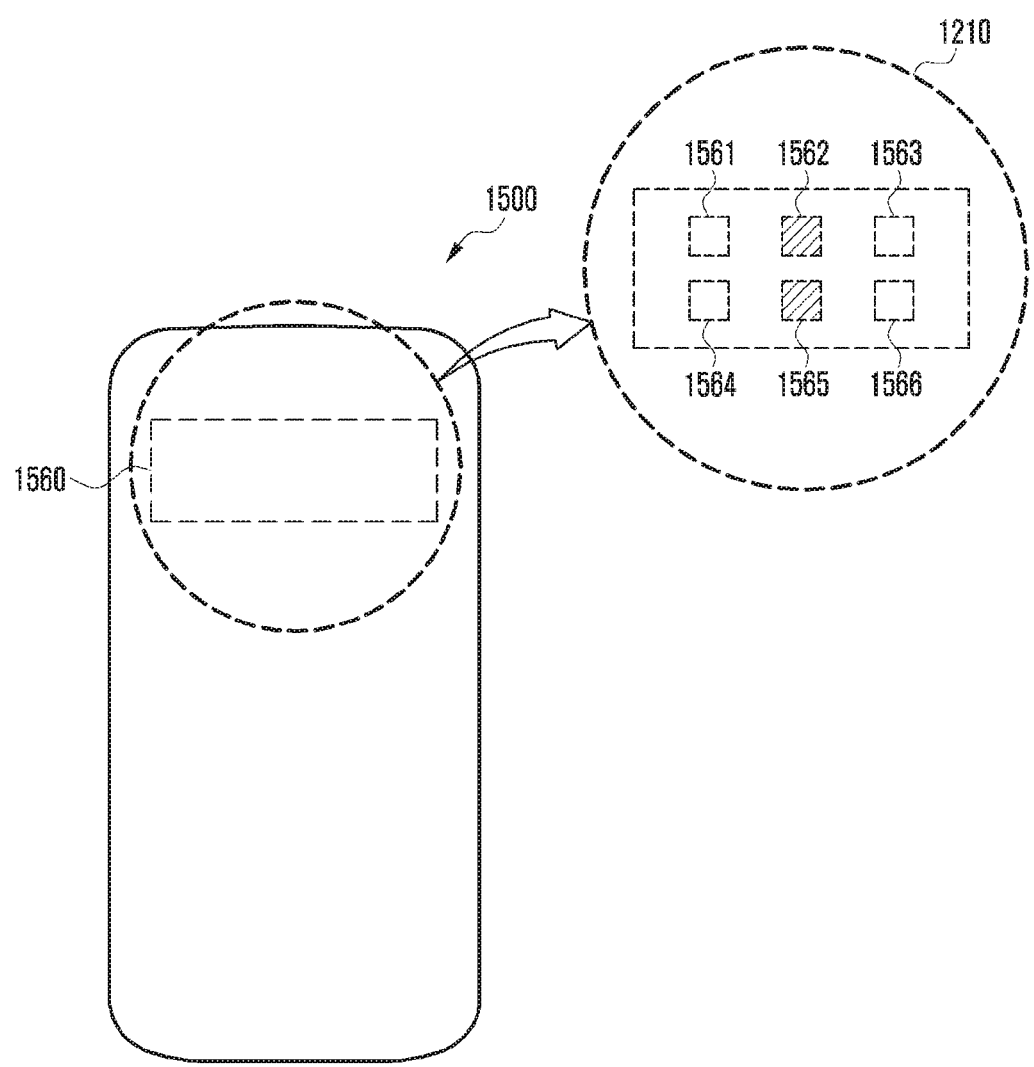

FIGS. 15A and 15B are diagrams illustrating example sound output based on the distance between an object (e.g., a user's ear) 10 and the electronic device 1500 according to various example embodiments.

As illustrated in FIG. 15A, the electronic device 1500 may include a transparent substrate 1510, a display panel 1520, and a touch panel (not shown) formed on the display panel 1520. A piezo driver layer 1530 may be arranged in the second direction of the display panel 1520, and the piezo driver layer 1530 may include multiple piezo driver sets 1532, 1534 and 1536. A vibration reduction layer 1540 may be arranged in the second direction of the piezo driver layer 1530 so as to transfer vibrations caused by at least one of the piezo driver sets 1532, 1534 and 1536 in the first direction not in the second direction.

In an example embodiment, a protection layer (not shown) may be included between the display panel 1520 and the piezo driver layer 1530. The protection layer may protect the display panel 1520 from physical shock and may assist transfer of vibrations caused by the piezo driver sets 1532, 1534 and 1536 to a desired region of the transparent substrate 1510 through the display panel 1520.

As illustrated in FIG. 15A, the electronic device 1500 may sense the distance between the ear 10 of the user and the transparent substrate 1510. The electronic device 1500 may include at least one sensor to sense the distance to an external object 10, and the sensor may be, for example, an optical proximity sensor. Alternatively, the electronic device 1500 may sense the distance between the ear 10 of a person and the transparent substrate 1510 according to a change in the capacitance of the transparent substrate 1510.

In an example embodiment, the electronic device 1500 may adjust the number of piezo drivers to be driven on the basis of the distance to the external object 10. For example, when the distance between the object 10 (e.g. user's ear) and the first region is less than a given distance, the electronic device 1500 may output sounds by use of a first piezo driver set 1560. Here, as illustrated in FIG. 15B, when the distance between the object 10 and the electronic device 1500 is close enough, only one or two of the six piezo drivers 1561 to 1566 in the first piezo driver set 1560 may be used to output sounds. Thereafter, when the distance to the external object 10 becomes far, the number of piezo drivers used to output sounds may be increased, increasing the volume of sounds.

Figure 16A:
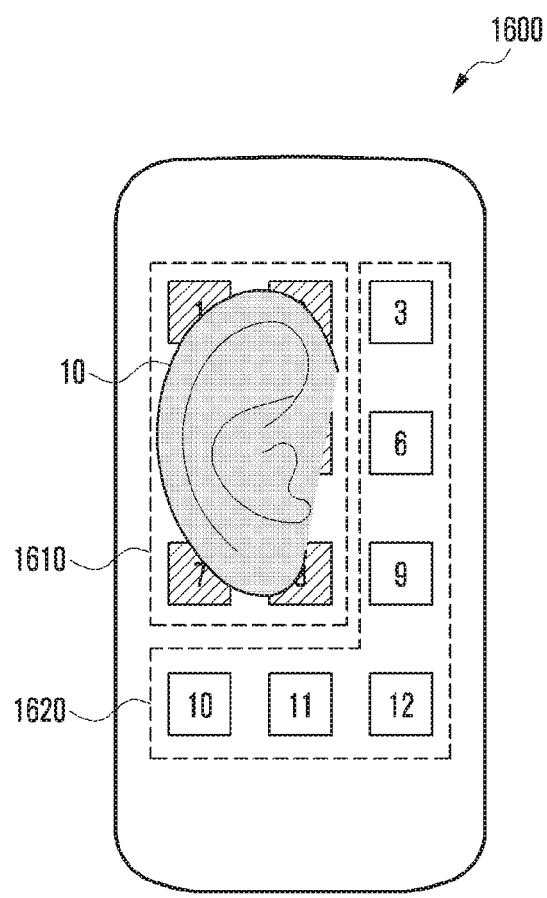
FIGS. 16A and 16B are diagrams illustrating example sound output based on the object contacting the electronic device according to various example embodiments.
Figure 16B:
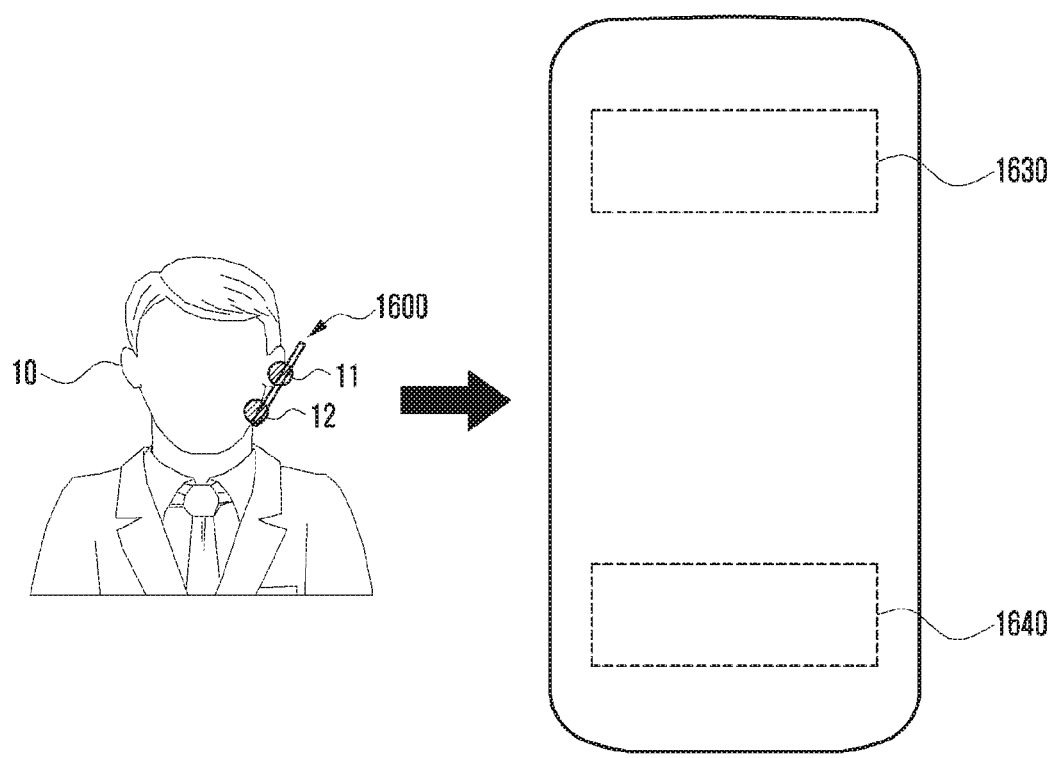

FIGS. 16A and 16B are diagrams illustrating example sound output based on the object (e.g., a user's ear) 10 contacting the electronic device 1600 according to various example embodiments.

The input unit of the electronic device 1500 may detect a contact with an external object 10 (e.g. a part of the body of the user), and identify the contacting object 10 based on the detected input. For example, the electronic device 1600 may distinguish a contact with the ear from a contact with the cheek, and may identify the intensity of contact.

Upon determining that the contacting object 10 is the ear, the electronic device 1600 may identify the region corresponding to the ear and output sounds using at least one piezo driver set arranged at the back of the identified region. That is, as illustrated in FIG. 16A, sound may be output by use of a piezo driver set vibrating the region 1610 contacting the ear of the user.

In an example embodiment, when the level of pressure applied by the object 10 to the electronic device 1600 is greater than a preset threshold, the electronic device 1600 may additionally use a piezo driver set placed in the second region 1620 other than the first region 1610 corresponding to the object 10. For example, when the first region 1610 of the electronic device 1600 is strongly brought into contact with the ear during a voice call, vibrations of the first region 1610 may be weaken owing to the applied pressure and the volume of output sound may be lowered correspondingly. In this case, for smooth call conversation with a suitable sound volume, the electronic device 1600 may use at least one piezo driver set placed in the second region 1620 to output sounds, increasing the volume of output sound.

In an example embodiment, when multiple inputs are detected on the input unit, the electronic device 1600 may determine at least one piezo driver set to be used for sound output on the basis of the properties of the detected inputs. For example, as illustrated in FIG. 16B, the electronic device 1600 may be brought into contact with both the ear 11 and the cheek 12 during a voice call. In this case, the electronic device 1600 may pre-store contact patterns of various body parts of the user. Later, when an object 10 (e.g. ear 11 or cheek 12) contacts the electronic device 1600, the electronic device 1600 may identify the contacting object 10 by comparing the contact region with the pre-stored contact patterns. Hence, the electronic device 1600 may use a piezo driver set placed in a region contacting the ear to output sounds on the basis of properties of inputs caused by a contact with a specific body part.

FIGS. 17A, 17B, 17C and 17D are diagrams illustrating example propagation paths of sounds output by the piezo driver set according to various example embodiments.

In an example embodiment, the electronic device 1710 may include a housing having a first surface in the first direction (or front direction) and a second surface in the second direction (or rear direction) opposite to the first direction. A transparent substrate may be formed in a region of the first surface of the housing, and a back cover 1720 may be formed in a region of the second surface.

The display 1712 may be arranged between the transparent substrate and the back cover 1720 and may substantially occupy the entire front face of the electronic device 1710 (full front display) as described in connection with FIGS. 4A to 4E. A bracket 1714 may be arranged in the second direction of the display 1712. The bracket 1714 may be omitted if necessary.

A PCB 1716 may be arranged in the second direction of the display 1712. Various components including the processor 920 and memory 940 illustrated in FIG. 9 may be mounted on the PCB 1716. A flexible PCB (FPCB) 1718 electrically connected with the PCB 1716 may control activation of at least one piezo driver set according to a control signal from the processor.

In an example embodiment, the electronic device 1710 may include a plurality of piezo driver sets. The piezo driver sets may be arranged between the display 1712 and the back cover 1720 within the housing. As described above in connection with FIG. 11, the piezo driver sets may be placed so as to correspond to the first region and/or the second region of the touch panel (or display panel). The electronic device 1700 may include, but not limited to, two piezo driver sets. Each piezo driver set may include one or more piezo drivers. The processor may adjust the number of piezo drivers to be driven according to the level of output sound.

In an example embodiment, the piezo driver set may output sounds by vibrating at least a portion of the display (or housing) according to an input detected on the transparent substrate (or touch panel). The display and the housing of the electronic device may be an outside surface directly contacting the air. The piezo driver set may vibrate in a given direction, and vibrations may be transferred directly or through a vibrating medium to a region of the display or housing for sound output.

FIGS. 17A to 17D illustrate detailed configurations of the electronic device enabling vibrations caused by multiple piezo driver sets to be transferred to the air. Although the configuration in FIGS. 17A to 17D is depicted as including only one piezo driver, the same configuration may also be applied to a case where multiple piezo drivers are present in one piezo driver set.

Figure 17A:
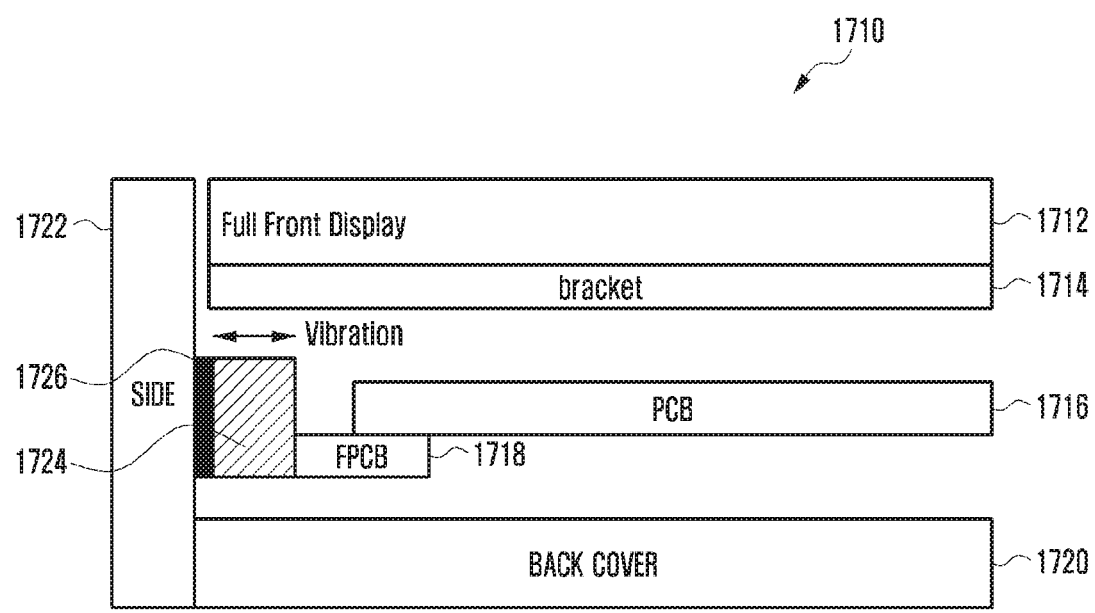
FIGS. 17A, 17B, 17C and 17D are diagrams illustrating example propagation paths of sounds output by the piezo driver set according to various example embodiments.

In an example embodiment, as illustrated in FIG. 17A, a piezo driver set 1724 among multiple piezo driver sets may be configured to contact a region 1726 of one side 1722 of the housing and vibrate in a direction perpendicular to the first direction and second direction, thereby vibrating the region 1726.

As illustrated in FIG. 17A, the piezo driver set 1724 may be placed between the display 1712 and the back cover 1720 and may be electrically connected with the FPCB 1718. When an electrical signal is applied to the piezo driver set 1724, the piezo driver set 1724 may vibrate in a direction perpendicular to the first direction and second direction. One end of the piezo driver set 1724 may directly contact the side 1722 of the electronic device, or a vibration transfer member may be formed between the end of the piezo driver set 1724 and the side 1722. Hence, vibrations caused by the piezo driver set 1724 may be transferred in the same direction to the side 1722 of the electronic device, causing the housing to vibrate. Hence, sounds are output into the air.

Figure 17B:
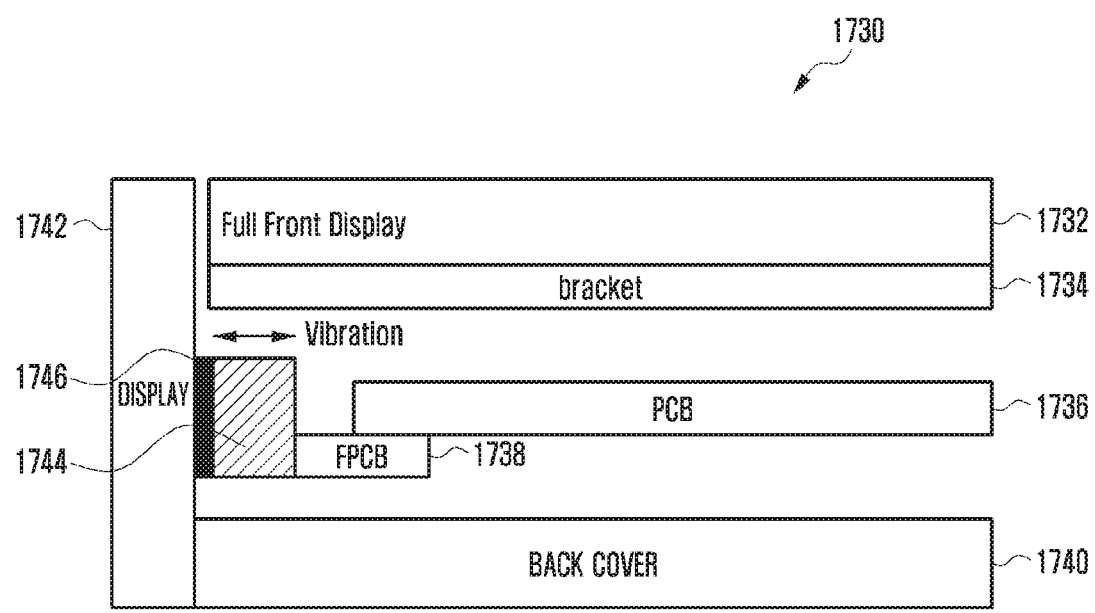

In an example embodiment, as illustrated in FIG. 17B, a side display may be arranged in a region contacting at least one of the piezo driver sets. As illustrated in FIG. 4D, the electronic device may include a sub display 444 in a region of one side; and as illustrated in FIG. 4E, the electronic device may include a curved edge display 454 in one side. In this case, the piezo driver set 1744 may vibrate in a direction perpendicular to the first direction and second direction, and resulting vibrations may be transferred in the same direction to the display 1742 arranged in one side of the electronic device.

In an example embodiment, the electronic device may further include a vibrating medium in contact with at least one of piezo driver sets and configured to transfer vibrations caused by at least one of the piezo driver sets to another part of the electronic device. The first surface of the vibrating medium comes into contact with a piezo driver set and the second surface thereof in a direction opposite to the first surface comes into contact with a different part of the electronic device. Hence, the vibrating medium may transfer vibrations caused by the piezo driver set to the different part. The second surface of the vibrating medium may transfer vibrations to different parts of the electronic device including a first part and a second part.

Figure 17C:
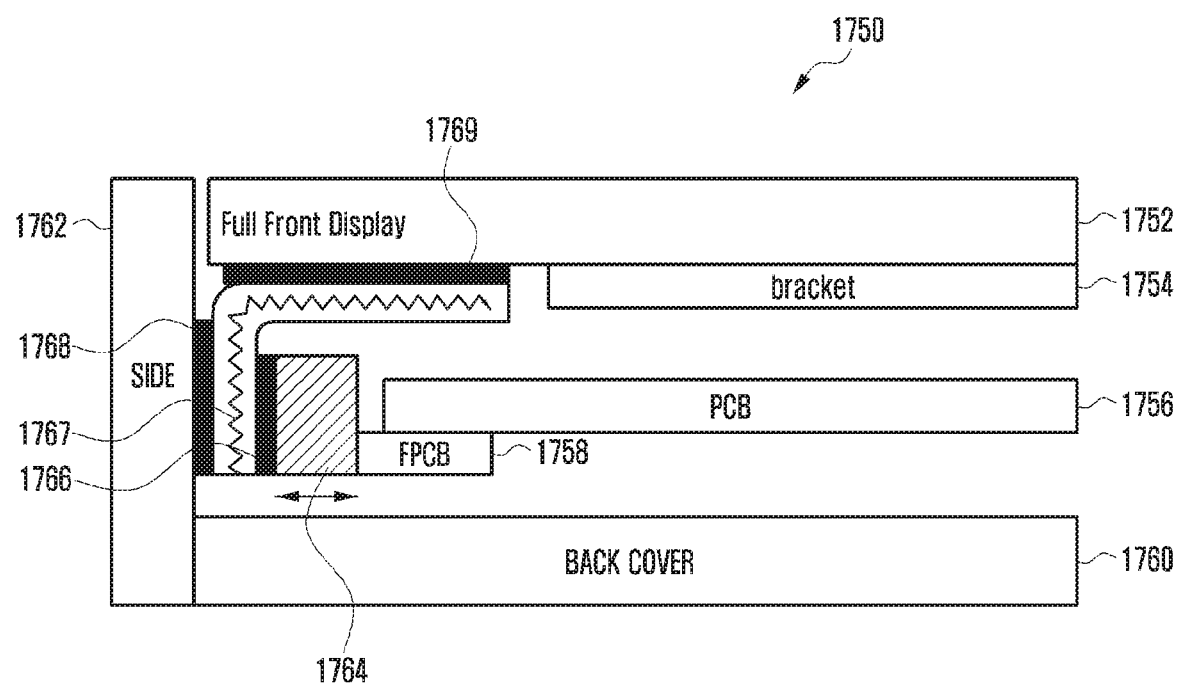

As illustrated in FIG. 17C, the first surface 1766 of the vibrating medium 1767 may contact the piezo driver set 1764. The second surface in a direction opposite to the first surface 1766 may include a first part 1769 and a second part 1768, and the first part 1769 and the second part 1768 may form a given angle (e.g. 90 degrees).

In an example embodiment, as illustrated in FIG. 17C, the first part 1769 may directly contact a portion of the back of the display 1752 or contact the bracket 1754 or the like to thereby transfer vibrations to the back of the display 1752. The second part 1768 may contact the side 1762 of the housing and may transfer vibrations to the side 1762. When the piezo driver set 1764 vibrates in a direction perpendicular to the first direction and the second direction, the second part 1768 may vibrate in the same direction as that of the piezo driver set 1764 to transfer vibrations to the side 1762 of the housing, and the first part 1769 may vibrate in a direction perpendicular to the direction of the piezo driver set 1764 (e.g., first direction and second direction) to transfer vibrations to the display 1752. As such, owing to vibrations caused by the piezo driver set 1764, sounds may be output from the front and side of the electronic device 1750 into the air.

Figure 17D:
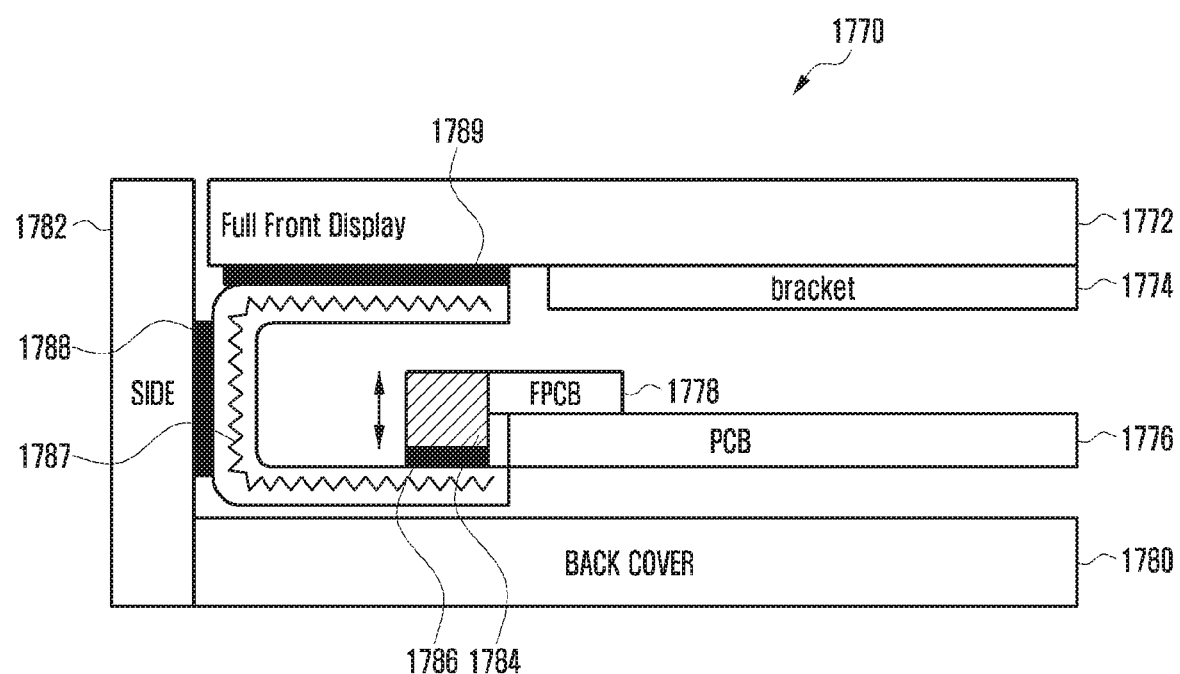

In an example embodiment, as illustrated in FIG. 17D, the second surface of the vibrating medium 1787 may include a first part 1789 to transfer vibrations to the back of the display 1772, a second part 1788 forming a given angle (e.g. 90 degrees) with the first part 1789 to transfer vibrations to the side 1782 of the electronic device, and a third part 1786 forming a given angle (e.g. 90 degrees) with the second part 1788 and placed in the first direction of the back cover.

When the piezo driver set 1784 vibrates in the first direction and the second direction, the third part 1786 of the vibrating medium 1787 contacting the piezo driver set 1784 may also vibrate in the first direction and the second direction. Vibrations caused by the piezo driver set 1784 may be transferred in a direction perpendicular to the first direction and the second direction to the second part 1788, causing the side 1782 of the housing to vibrate in a direction perpendicular to the first direction and the second direction. Vibrations of the piezo driver set 1784 in the first direction and the second direction may cause the first part 1789 to vibrate in the first direction and the second direction, thereby vibrating the display 1772. As such, owing to vibrations caused by the piezo driver set 1784, sounds may be output from the front and side of the electronic device into the air.

Figure 18:
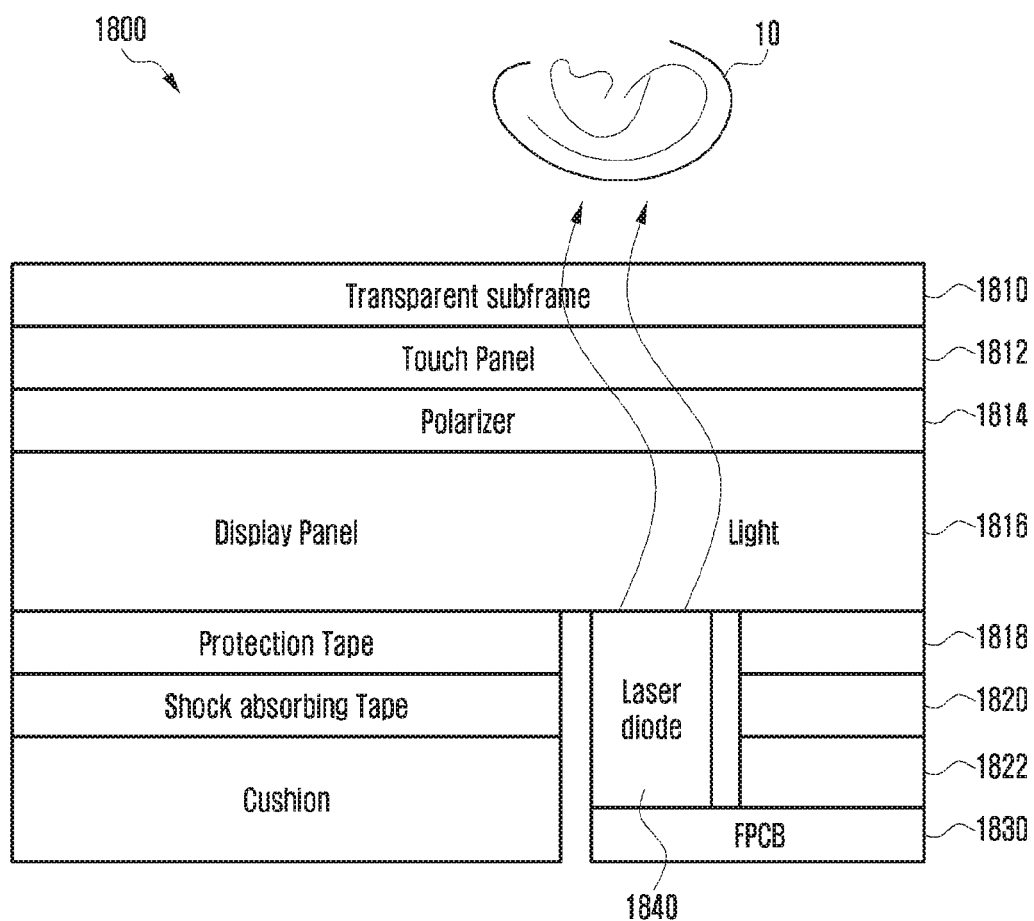
FIG. 18 is a diagram illustrating an example electronic device having a laser diode according to various example embodiments.

FIG. 18 is a diagram illustrating an example electronic device having a laser diode according to various example embodiments.

FIG. 18 depicts a situation where the user 10 wearing an auxiliary device, which can convert a sound signal into a laser beam and convert a laser beam into a sound signal, listens to a sound signal from the electronic device 1800.

As illustrated in FIG. 18, the electronic device 1800 may include a transparent substrate 1810, a touch panel 1812, a polarizer layer 1814, and a display panel 1816 in sequence in the front to rear direction (or in the first to second direction). A protective tape 1818, a shock-absorbing tape 1820, and a cushion layer 1822 may be arranged at least partly in the second direction of the display panel 1816 to mitigate shock to the display.

In an example embodiment, an empty space may be formed in the protective tape 1818, shock-absorbing tape 1820, and cushion layer 1822 by removing a part thereof in the second direction, and a laser diode 1840 may be placed in the space and be coupled to the flexible printed circuit board (FPCB) 1830. Light emitted by the laser diode 1840 may pass through the display panel 1816, polarizer layer 1814, touch panel 1812, and transparent substrate 1810 and reach the outside.

Hence, the auxiliary device worn by the user 10 may receive a laser beam emitted by the laser diode 1840, convert the laser beam into a sound signal, and provide the sound signal to the user 10.

According to various example embodiments of the present disclosure, an electronic device may include: an input unit comprising input circuitry configured to sense an input from the outside of the electronic device; a plurality of piezo drivers including a first piezo driver and a second piezo driver; and a processor functionally connected with the input unit. The processor may be configured to detect an input through the input circuitry of the input unit, to use a first piezo driver set including the first piezo driver to output sounds when the detected input corresponds to a first input, and to use a second piezo driver set including the second piezo driver to output sounds when the detected input corresponds to a second input.

In an example embodiment, the input circuitry of the input unit may include a touch input, and the processor may be configured to identify at least one region of the touch input where an input is detected, to determine that the detected input is a first input when the identified region corresponds to a first region, and to determine that the detected input is a second input when the identified region corresponds to a second region.

In an example embodiment, the processor may be configured to, in response to a detected input, vibrate the region of the input unit where the input is detected using the first piezo driver set or the second piezo driver set.

In an example embodiment, the processor may be configured to vibrate the first region of the touch input section using at least the first piezo driver set in response to a detected first input, and to vibrate the second region of the touch input section using at least the second piezo driver set in response to a detected second input.

In an example embodiment, the processor may be configured to vibrate the first region using at least a part of the first piezo driver set and at least a part of the second piezo driver set when the intensity of a detected first input is greater than or equal to a preset threshold.

In an example embodiment, the first piezo driver set or the second piezo driver set may be disposed in at least one of the back of the input unit and the side of the electronic device.

In an example embodiment, the processor may be configured to determine the number of piezo drivers to be driven from among the multiple piezo drivers based on at least a level of output sound.

In an example embodiment, the processor may be configured to determine the number of piezo drivers to be driven from among the multiple piezo drivers based on a distance between an external object and the electronic device.

In an example embodiment, when multiple inputs are detected on the input unit, the processor may be configured to determine at least one piezo driver set to be used for sound output based on properties of the multiple inputs.

According to various example embodiments of the present disclosure, an electronic device may include: a housing having a first surface facing a first direction and a second surface facing a second direction opposite to the first direction, and including a transparent substrate comprising at least a portion of the first surface and a back cover comprising at least a portion of the second surface; a display disposed between the transparent substrate and the back cover; and a plurality of piezo driver sets disposed between the display and the back cover. The piezo driver sets being configured to output sounds by vibrating at least a portion of the display or the housing based on an input detected on the transparent substrate.

In an example embodiment, at least one of the piezo driver sets may be configured to contact at least a portion of the side of the housing and vibrate the side by vibrating in a direction perpendicular to the first direction and the second direction.

In an example embodiment, a side display may be disposed in a region contacting at least one of the piezo driver sets.

In an example embodiment, the electronic device may further include a vibrating medium having a first surface that contacts at least one of the piezo driver sets to transfer vibrations caused by the at least one of the piezo driver sets.

In an example embodiment, a second surface of the vibrating medium disposed in the opposite direction to the first surface may include a first part contacting at least a portion of the back of the display and a second part contacting the side of the housing.

In an example embodiment, at least one of the piezo driver sets may transfer vibrations to the vibrating medium by vibrating in a direction perpendicular to or parallel with the first direction and the second direction.

Figure 19:
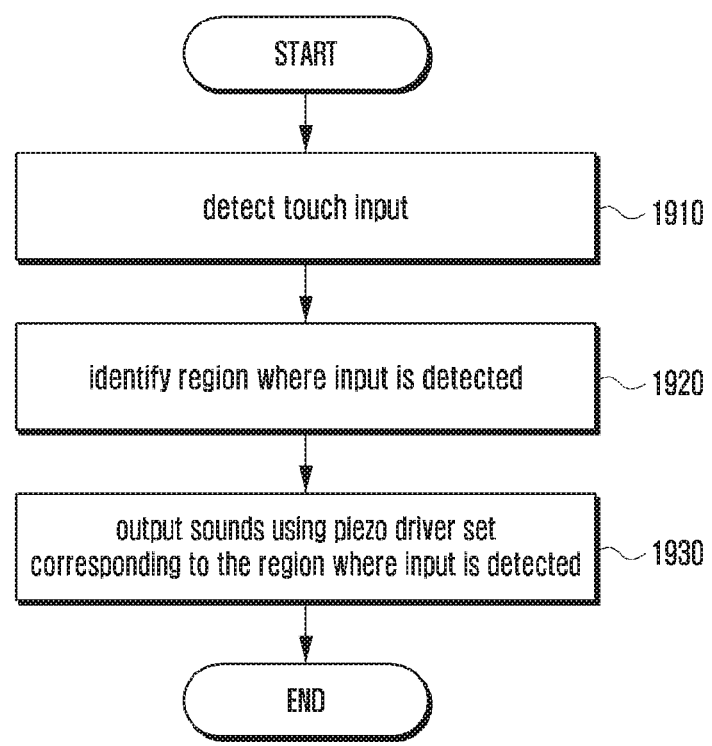
FIG. 19 is a flowchart illustrating an example method of outputting sound in an electronic device according to various example embodiments.

FIG. 19 is a flowchart illustrating an example method of outputting sound in the electronic device according to various example embodiments.

The sound output method may be carried out by the electronic device described in connection with FIGS. 1 to 18. A description on the technical aspects of the electronic device is omitted herein.

As described above, the electronic device may include a display occupying substantially the entire front face and a plurality of piezo driver sets for sound output arranged in at least one of the back of the display and the side of the electronic device.

At operation 1910, the input unit (e.g. input unit 910 in FIG. 9) of the electronic device detects an input on the touch panel.

At operation 1920, the processor (e.g. processor 920 in FIG. 9) of the electronic device identifies the region where the input is detected. For example, as illustrated in FIG. 11, the processor may determine whether the region where the input is detected is the first region or the second region.

At operation 1930, the processor of the electronic device outputs sounds using a piezo driver set corresponding to the region where the input is detected (e.g. first piezo driver set 932 or second piezo driver set 934 in FIG. 9). The processor may output sounds into the air by controlling the piezo driver set to vibrate at least the region where the input is detected. For example, to output sounds, when an input is detected in the first region, vibrations caused by the first piezo driver set corresponding to the first region may be transferred to the first region; and when an input is detected in the second region, vibrations caused by the second piezo driver set corresponding to the second region may be transferred to the second region.

According to various example embodiments of the present disclosure, a method of sound output in an electronic device may include: detecting an input on a touch input section; identifying at least a region where the input is detected; and outputting sounds using a piezo driver set corresponding to the region where the input is detected among multiple piezo driver sets.

In an example embodiment, outputting sounds may include vibrating at least a portion of the region where the input is detected using the piezo driver set.

In an example embodiment, the piezo driver sets may be disposed in at least one of the back of the touch input section and the side of the electronic device.

In an example embodiment, outputting sounds may include determining the number of piezo drivers to be driven from among multiple piezo drivers at least partially based on the level of output sound.

In an example embodiment, the method may further include: identifying, when multiple inputs are detected on the touch input section, properties of the multiple inputs; and determining at least one piezo driver set to use for sound output based on the properties of the multiple inputs.

While the present disclosure has been illustrated and described with reference to various example embodiments thereof, it will be understood by those skilled in the art that the foregoing examples are intended to be illustrative, not limiting. Thus, various modifications, variations and alternatives may fall within the true spirit and full scope of the disclosure as defined by the appended claims.

What is claimed is:

1. An electronic device comprising:
   an input unit comprising input circuitry configured to detect an input from outside of the electronic device;
   a plurality of piezo drivers including a first piezo driver configured to vibrate a first region of the input unit to output sounds on at least part of the first region and a second piezo driver configured to vibrate a second region of the input unit to output sounds on at least part of the second region; and
   a processor functionally connected with the input unit,
   wherein the processor is configured to:
   detect an input through the input circuitry of the input unit during a voice call,
   determine a type of an external object contacting to the input unit, based on the input,
   determine whether the type of the external object is a predetermined type,
   output sounds of the voice call using a first piezo driver set including the first piezo driver, when the detected input corresponds to a first input detected on the first region of the input unit and the type of the external object is the predetermined type,
   output sounds of the voice call using a second piezo driver set including the second piezo driver, when the detected input corresponds to a second input detected on the second region of the input unit and the type of the external object is the predetermined type,
   determine a distance between the external object and the input unit when the external object is spaced apart from the input unit, after the external object contacts to the input unit, and
   adjust a volume of the output sounds of the voice call by adjusting a number of piezo drivers to be driven from a plurality of piezo drivers of the first piezo driver set or the second piezo driver set, based on the distance between the external object and the input unit.

2. The electronic device of claim 1, wherein the input circuitry of the input unit configured to detect a touch input on the input unit.

3. The electronic device of claim 1, wherein the processor is configured to vibrate the first region using at least a part of the first piezo driver set and at least a part of the second piezo driver set when the intensity of a detected first input is greater than or equal to a preset threshold.

4. The electronic device of claim 1, wherein the first piezo driver or the second piezo driver is disposed in at least one of the back of the input unit and the side of the electronic device.

5. The electronic device of claim 1, wherein the processor is configured to determine the number of piezo drivers to be driven from among the multiple piezo drivers based on at least a level of output sound.

6. The electronic device of claim 1, wherein, when multiple inputs are detected on the input unit, the processor is configured to determine at least one piezo driver set to use for sound output based on properties of the multiple inputs.

7. An electronic device comprising:
   a housing including a first surface facing a first direction and a second surface facing a second direction opposite the first direction, and further including a transparent substrate comprising at least a portion of the first surface and a back cover comprising at least a portion of the second surface;
   a display disposed between the transparent substrate and the back cover; and
   a plurality of piezo driver sets, including first and second sets, disposed between the display and the back cover,
   wherein, when an input on the transparent substrate is detected during a voice call, the piezo driver sets are configured to output sounds of the voice call by vibrating at least a portion of the display and/or the housing using at least part of the piezo driver sets that corresponds to region of the input on the transparent substrate,
   wherein, when a type of an external object contacting to the transparent substrate is a predetermined type, the piezo driver sets are configured to output the sounds of the voice call using at least part of the piezo driver sets that corresponds to region contacting with the predetermined type external object,
   wherein each of the piezo driver sets includes a plurality of piezo drivers,
   the piezo driver set is configured to drive at least one of piezo driver based on a distance between the external object and the display for adjusting a volume of the output sound when the external object is spaced apart from the display after the external object contacts to the input unit, and
   a processor configure to determine the distance between the external object and the display when the external object is spaced apart from the display, after the external object contacts to the device, and to adjust the volume of the output sound by adjusting a number of piezo drivers to be driven from a plurality of piezo drivers of the first piezo driver set or the second piezo driver set, based on the distance between the external object and the display.

8. The electronic device of claim 7, wherein at least one of the piezo driver sets is configured to contact at least a portion of a side of the housing and vibrate the side by vibrating in a direction perpendicular to the first direction and the second direction.

9. The electronic device of claim 8, wherein a side display is disposed in a region of the electronic device contacting at least one of the piezo driver sets.

10. The electronic device of claim 7, further comprising a vibrating medium having a first surface configured to contact at least one of the piezo driver sets and to transfer vibrations caused by the at least one of the piezo driver sets.

11. The electronic device of claim 10, wherein a second surface of the vibrating medium disposed in a direction opposite the first surface is configured to include a first part contacting at least a portion of a back of the display and a second part contacting a side of the housing.

12. The electronic device of claim 11, wherein at least one of the piezo driver sets is configured to transfer vibrations to the vibrating medium by vibrating in a direction perpendicular to and/or parallel with the first direction and the second direction.

13. A method of sound output for an electronic device, the method comprising:
  detecting an input during a voice call;
  identifying at least a region where the input is detected;
  determine a type of an external object contacting to an input unit of the electronic device, based on the input;
  determine whether the type of the external object is a predetermined type;
  output sounds of the voice call using a first piezo driver set including a first piezo driver configured to vibrate a first region of the input unit, when the detected input corresponds to a first input detected on the first region of the input unit and the type of the external object is the predetermined type,
  output sounds of the voice call using a second piezo driver set including a second piezo driver configured to vibrate a second region of the input unit, when the detected input corresponds to a second input detected on the second region of the input unit and the type of the external object is the predetermined type
  determining a distance between the external object and the input unit, when the external device is spaced apart from the input unit after the external object contacts to the input unit, and
  adjusting a volume of the output sounds of the voice call by adjusting a number of piezo drivers to be driven from a plurality of piezo drivers of the first piezo driver set or the second piezo driver set, based on the distance between the external object and the input unit.

14. The method of claim 13, wherein the piezo driver sets are disposed in at least one of a back of the input unit and the side of the electronic device.

15. The method of claim 13, wherein outputting sounds comprises determining a number of piezo drivers to be driven from among multiple piezo drivers based on at least a level of output sound.

16. The method of claim 13, further comprising:
  identifying, when multiple inputs are detected on the touch input, properties of the multiple inputs; and
  determining at least one piezo driver set to use for sound output based on the identified properties of the multiple inputs.

* * * * *